(12) United States Patent
Singh et al.

(10) Patent No.: US 10,950,850 B2
(45) Date of Patent: Mar. 16, 2021

(54) ROBUST MOS2/GRAPHENE COMPOSITE PAPER BASED ELECTRODES FOR NA+ BATTERY APPLICATIONS

(71) Applicant: Kansas State University Research Foundation, Manhattan, KS (US)

(72) Inventors: Gurpreet Singh, Manhattan, KS (US); Lamuel David, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 191 days.

(21) Appl. No.: 16/129,049

(22) Filed: Sep. 12, 2018

(65) Prior Publication Data

US 2019/0081320 A1 Mar. 14, 2019

Related U.S. Application Data

(62) Division of application No. 14/910,451, filed as application No. PCT/US2014/049803 on Aug. 5, 2014, now abandoned.

(Continued)

(51) Int. Cl.
*H01M 4/13* (2010.01)
*H01M 4/36* (2006.01)
(Continued)

(52) U.S. Cl.
CPC .......... *H01M 4/364* (2013.01); *H01M 4/133* (2013.01); *H01M 4/136* (2013.01); *H01M 4/587* (2013.01);
(Continued)

(58) Field of Classification Search
CPC ...... H01M 4/364; H01M 4/133; H01M 4/136; H01M 4/5815; H01M 4/587; H01M 10/054; H01M 2004/027
See application file for complete search history.

(56) References Cited

U.S. PATENT DOCUMENTS 4,822,590 A * 4/1989 Morrison ................ C01B 17/20
106/DIG. 2
8,361,321 B2 1/2013 Stetson et al.
(Continued)

FOREIGN PATENT DOCUMENTS

WO 2012028724 3/2012

OTHER PUBLICATIONS

The International Search Report and Written Opinion dated Apr. 20, 2015 in the PCT/US14/49803 filed Aug. 5, 2014.
(Continued)

*Primary Examiner* — Jane J Rhee
(74) *Attorney, Agent, or Firm* — Hovey Williams LLP

(57) ABSTRACT

The synthesis of layered freestanding papers composed of acid-functionalized, few-layer molybdenum disulfide ($MoS_2$) and reduced graphene oxide (rGO) flakes for use as a binder-free conducting electrode in NIB applications are described. The mechanical and electrochemical performance of the layered freestanding papers is also described. Synthesis was achieved through vacuum filtration of highly homogenous dispersions comprising varying weight percentages of exfoliated $MoS_2$ flakes in graphene oxide in DI water, followed by thermal reduction. The electrochemical behavior of the composite paper was evaluated as a counter electrode against pure Na foil in a half-cell configuration. In addition, the uniaxial tensile testing of the composite papers demonstrated their exceptionally high fracture strength.

11 Claims, 18 Drawing Sheets

Related U.S. Application Data

(60) Provisional application No. 61/862,289, filed on Aug. 5, 2013.

(51) Int. Cl.
    *H01M 4/133*      (2010.01)
    *H01M 4/136*      (2010.01)
    *H01M 4/58*      (2010.01)
    *H01M 4/587*      (2010.01)
    *H01M 10/054*      (2010.01)
    *H01M 4/02*      (2006.01)

(52) U.S. Cl.
    CPC ....... *H01M 4/5815* (2013.01); *H01M 10/054* (2013.01); *H01M 2004/027* (2013.01)

(56) References Cited

U.S. PATENT DOCUMENTS

| | | |
|---|---|---|
| 2011/0262810 A1 | 10/2011 | Lemmon et al. |
| 2012/0172648 A1* | 7/2012 | Seebauer ................ B01J 27/08 585/733 |

OTHER PUBLICATIONS

The Office Action dated Jun. 13, 2018, in U.S. Appl. No. 14/910,451, filed Feb. 5, 2016.

\* cited by examiner

| rGO | 20 MoS$_2$ | 50 MoS$_2$ | 70 MoS$_2$ |

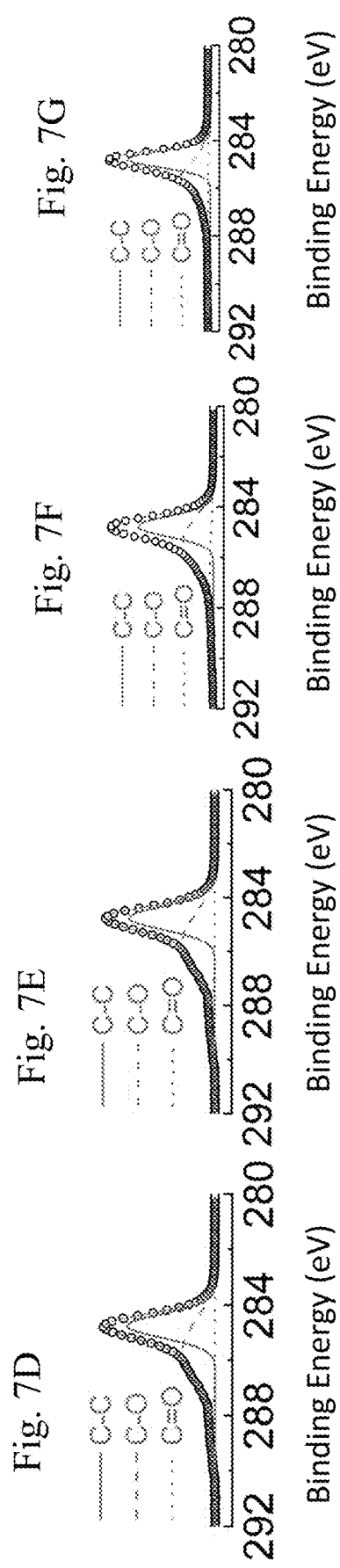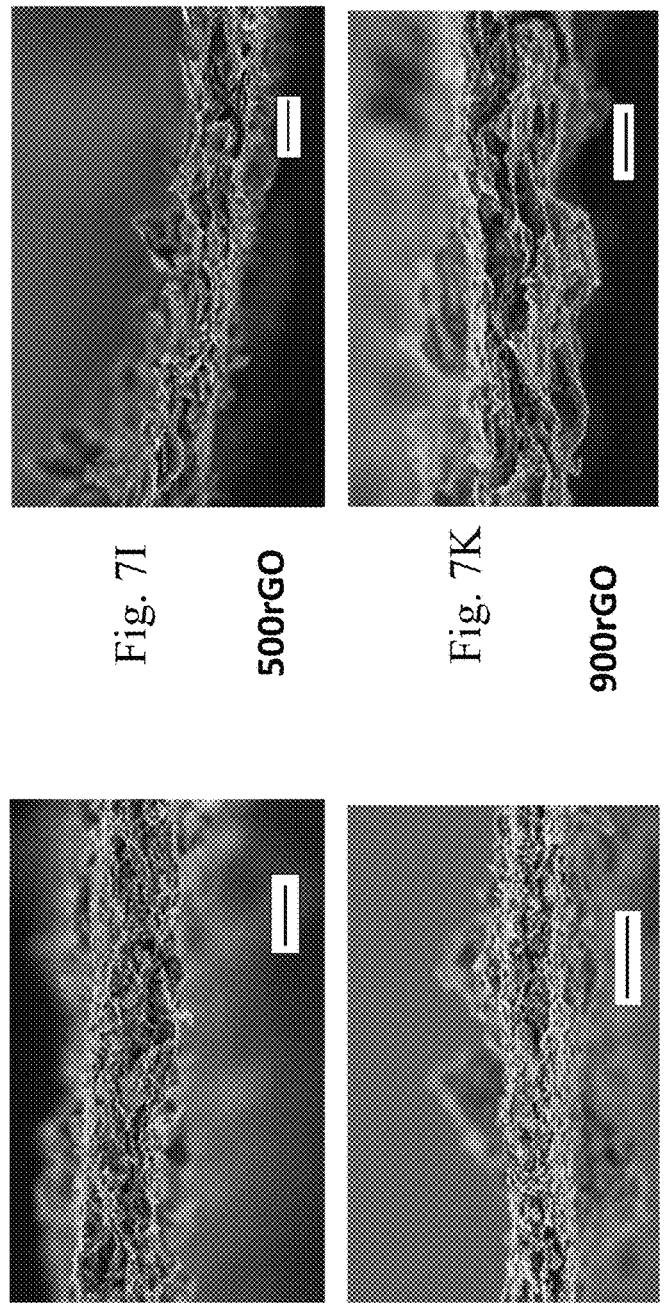

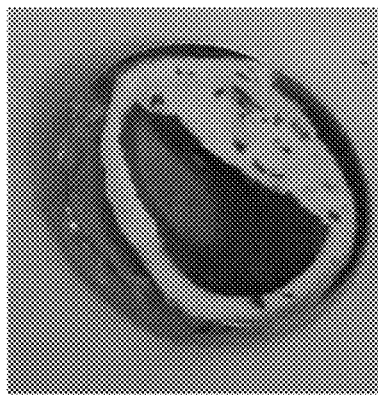 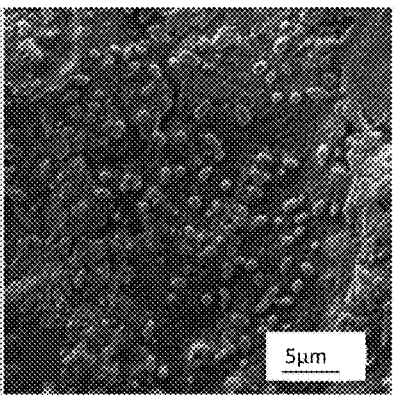 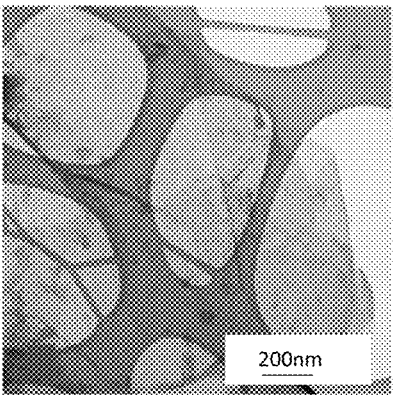
Fig. 10A　　　Fig. 10B　　　Fig. 10C
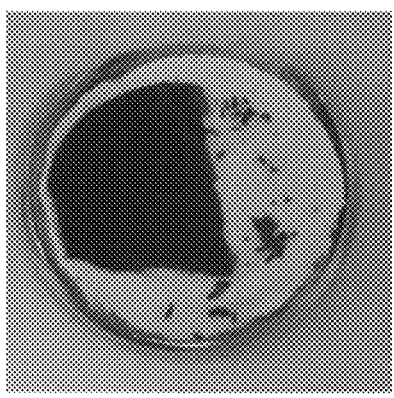 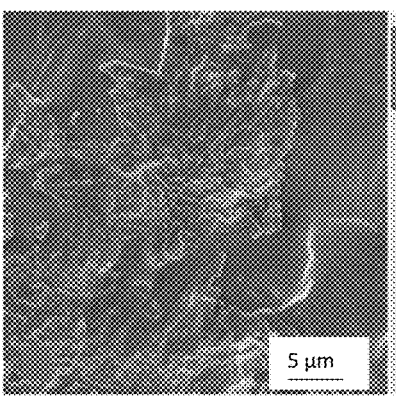 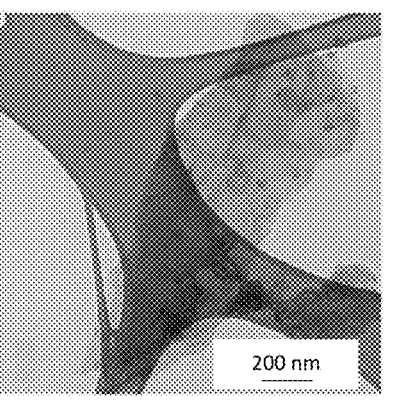
Fig. 10D　　　Fig. 10E　　　Fig. 10F

ROBUST MOS2/GRAPHENE COMPOSITE PAPER BASED ELECTRODES FOR NA+ BATTERY APPLICATIONS

RELATED APPLICATION

The present application is a divisional of U.S. application Ser. No. 14/910,451, filed Feb. 5, 2016, which is a national stage submission under 35 U.S.C. 371 of International Application No. PCT/US14/49803, filed Aug. 5, 2014, which claims the priority benefit of U.S. Provisional Patent Application Ser. No. 61/862,289, filed Aug. 5, 2013, entitled ROBUST MoS$_2$/GRAPHENE COMPOSITE PAPER BASED ELECTRODES FOR NA$^+$ BATTERY APPLICATIONS, each of which is incorporated by reference in its entirety herein.

BACKGROUND OF THE INVENTION

Field of the Invention

The present invention relates to sodium ion batteries and the use of a high capacity storage mechanism for Na ion insertion using a MoS$_2$/graphene nanocomposite.

Description of Related Art

Lithium ion batteries (LIBs) have been researched extensively for a variety of energy-storage applications that include portable electronic devices and electric vehicles. However, there are concerns over the cost, safety, and availability of Li reserves for large-scale applications involving renewable energy integration and the electrical grid. As a result, sodium ion batteries (SIBs) have drawn increasing attention because, in contrast to lithium, sodium resources are practically inexhaustible. Additionally, sodium is far less expensive and involves a greener synthesis method while maintaining a similar ion insertion chemistry. However, many challenges remain before SIBs can become commercially competitive with the LIB technology. For instance, Na ions are about 55% larger in radius than Li ions. This makes it difficult to find a suitable host material to accommodate Na ions and allow reversible and rapid ion insertion and extraction. However, from an electrochemical point of view, sodium has a very negative redox potential (−2.71 V, vs. SHE) and a small electrochemical equivalent (0.86 gA/h), which makes it the most advantageous element for battery applications after lithium. Despite encouraging work on Na-based battery chemistry in the past decades, only high-temperature Na/S (operating at 300° C.) and Na/NiCl$_2$ (ZEBRA battery) systems have been commercially developed for electric vehicles and MWh scale electric energy storage. A major obstacle hindering the broad market penetration of these Na batteries is the long-term stability and endurance of the battery components at the high temperatures of 300° C. or higher. If a room temperature Na+ ion rocking chair battery (SIB) can be achieved, it would bring about a great improvement in the safety and operational simplicity with respect to conventional high temperature SIBs and also a remarkable decrease in cost with regard to LIBs, thus ensuring sustainable applications for large scale electric energy storage.

There is a need in the art for a SIB that can operate at or near room temperature with good cycling stability and at high charge-discharge rates.

SUMMARY OF THE INVENTION

In one embodiment, the invention provides a composition comprising a carbonaceous material selected from the group consisting of graphene and reduced graphene oxide. The composition further comprises sodium ions therein.

The invention further provides an electrode comprising the foregoing composition, as well as a battery comprising the inventive electrode.

In another embodiment, a method of cycling sodium ions is provided. The method comprises providing a composition comprising a carbonaceous material selected from the group consisting of graphene and reduced graphene oxide. The composition comprises a number of channels therein, and the method comprises introducing sodium ions into at least some of the channels.

The invention is also directed towards a method of preparing an exfoliated dichalcogenide. The method comprises providing a dichalcogenide to be exfoliated. The dichalcogenide is contacted with a superacid to yield the exfoliated dichalcogenide.

In yet another embodiment, the invention provides a method of forming a composition useful as an electrode. The method comprises removing solids from a suspension of graphene oxide and a transition metal dichalcogenide to yield a composite. The composite is heated at a temperature of from about 300° C. to about 900° C. for a time period of from about 100 minutes to about 140 minutes to yield a heat-treated composite comprising reduced graphene oxide. In another embodiment, the composite is preferably heated at a temperature of from about 300° C. to about 600° C., and more preferably from about 450° C. to about 550° C. for about 115-125 minutes.

The invention is also directed towards a reduced graphene oxide electrode having a sodium capacity of at least about 110 mAh/g, with respect to the weight of the electrode and at 100 mA/g. That sodium capacity exists for at least about 40 cycles.

Finally, the invention is also concerned with a method of forming a high-sodium capacity, reduced graphene oxide electrode. The method comprises heating a composition comprising reduced graphene oxide at a temperature of from about 450° C. to about 550° C. for a time period of from about 60 minutes to about 180 minutes to form the electrode.

BRIEF DESCRIPTION OF THE DRAWING FIGURES

FIG. 1 is a schematic representation showing synthesis of a rGO/MoS$_2$ composite paper according to the invention, along with the electrochemical testing carried out using it as an anode in a half-cell configuration;

FIG. 2A-E are scanning electron microscope (SEM) photographs of: rGO; 20MoS$_2$; 50MoS$_2$, 70MoS$_2$ and 90MoS$_2$ paper, respectively;

FIGS. 2F-J are the corresponding SEM cross-sectional images of the materials of FIGS. 2A-E, respectively. The inserts in FIGS. 2A-D are digital photographs demonstrating the flexibility of the inventive rGO and rGO/MoS$_2$ paper shown in the corresponding SEM image;

FIGS. 2K-O are TEM images and SAED patterns (insert) of rGO and rGO/MoS$_2$ composites corresponding to the SEM images in FIGS. 2 A-E, respectively;

Figure 4A:
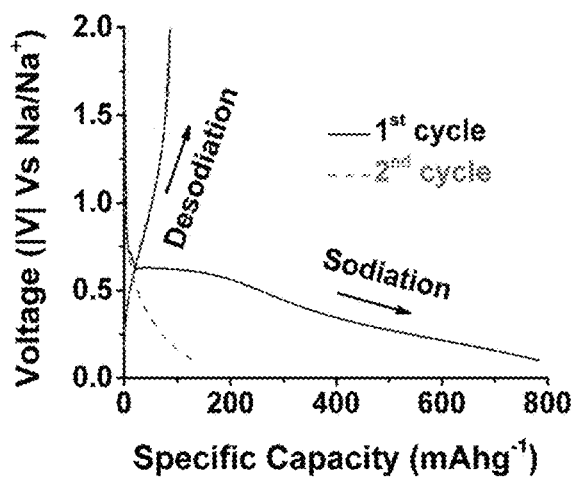
Figure 4B:
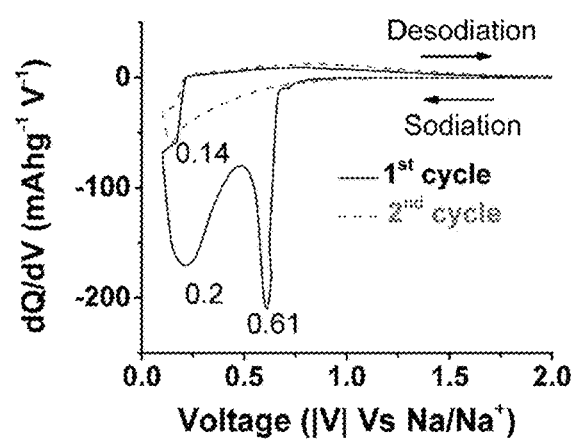
Figure 4C:
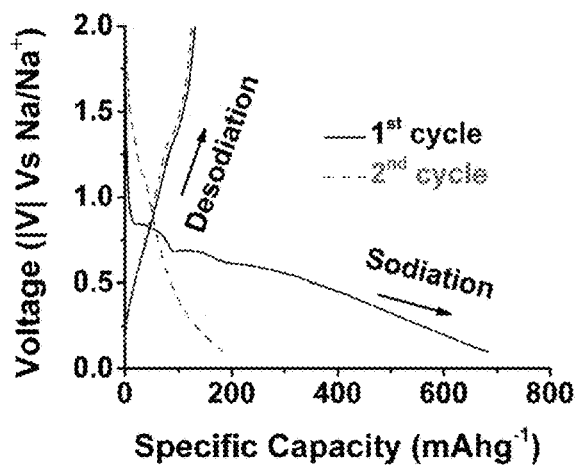
Figure 5:
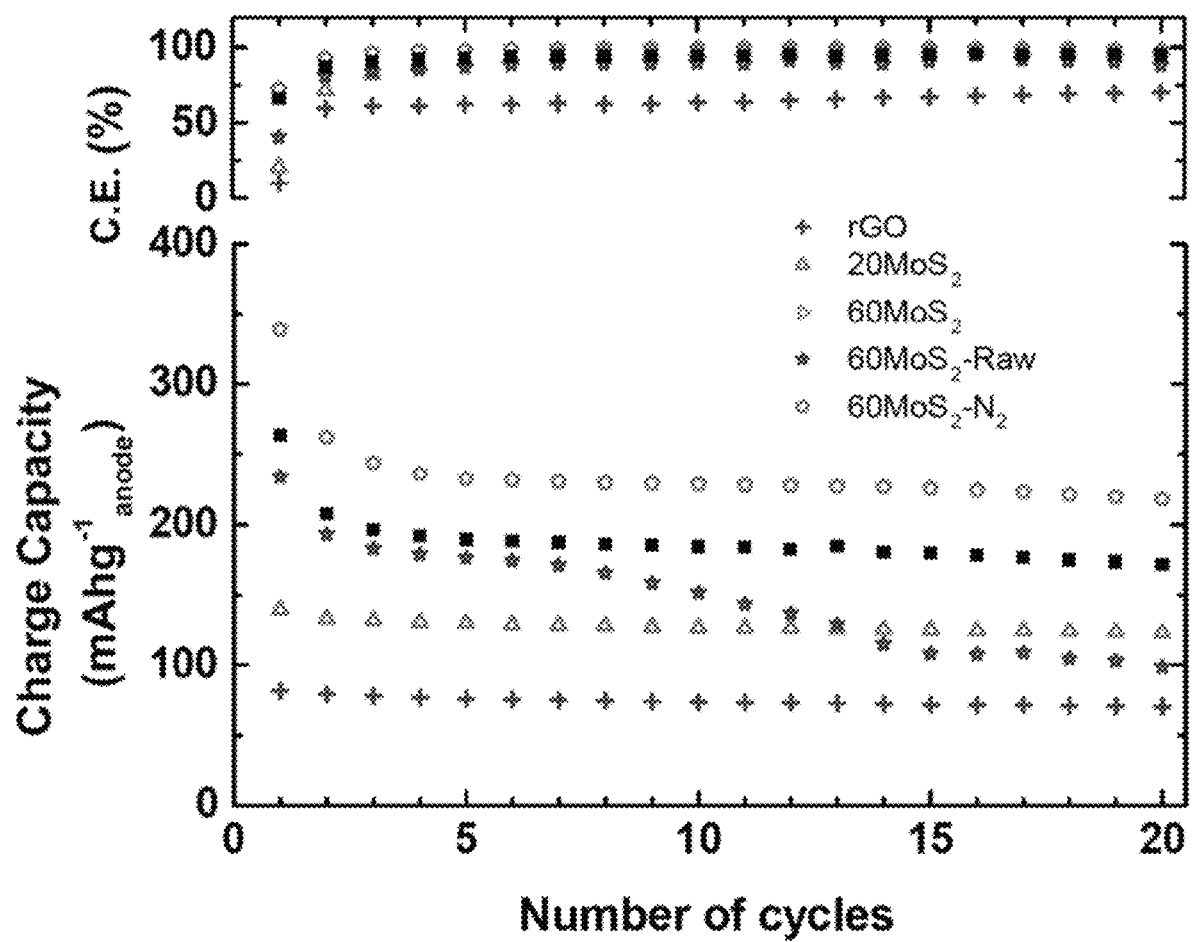
Figures 6A, 6B, 6C, 6D:
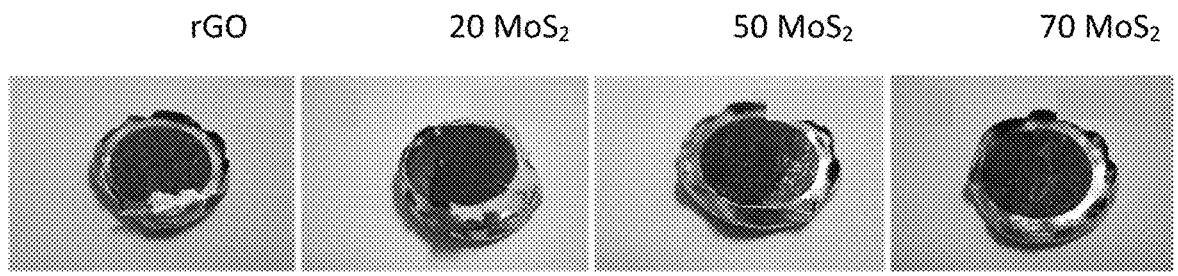
Figures 6E, 6F, 6G, 6H:
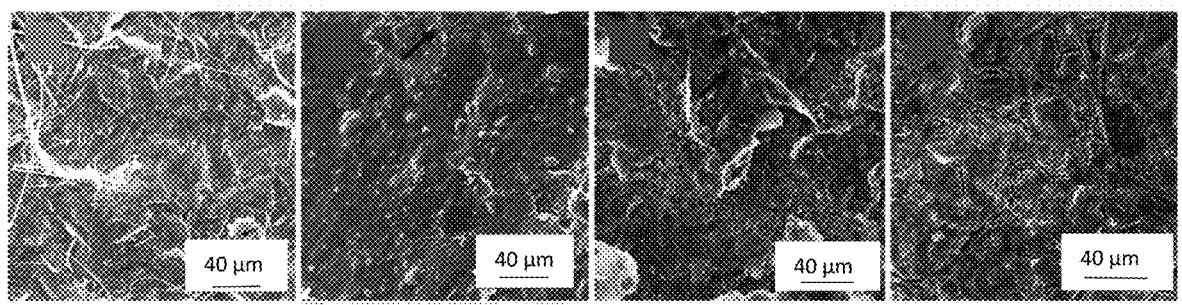
Figures 6I, 6J, 6K, 6L:
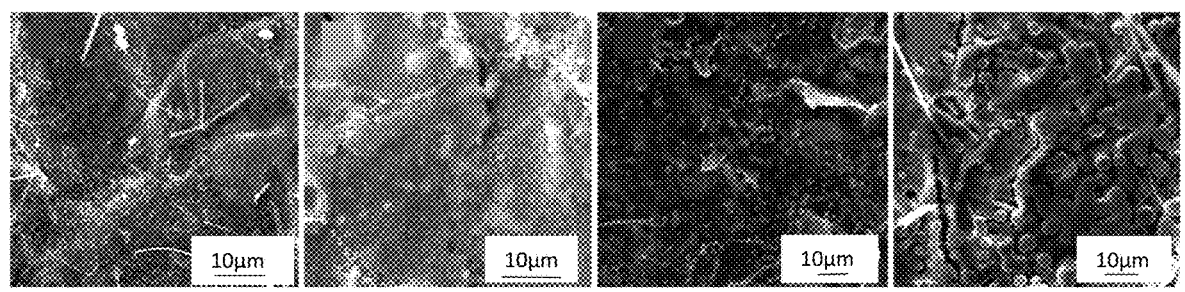
Figure 8B:
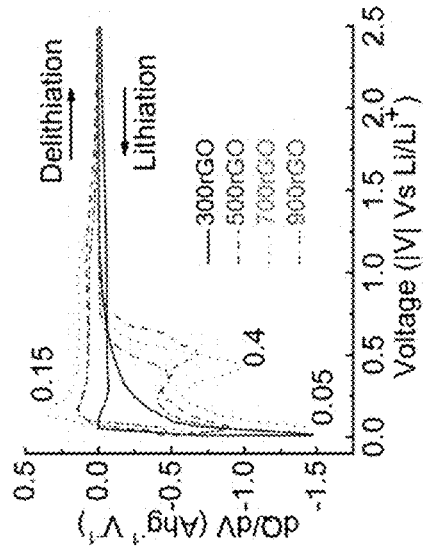
Figure 8D:
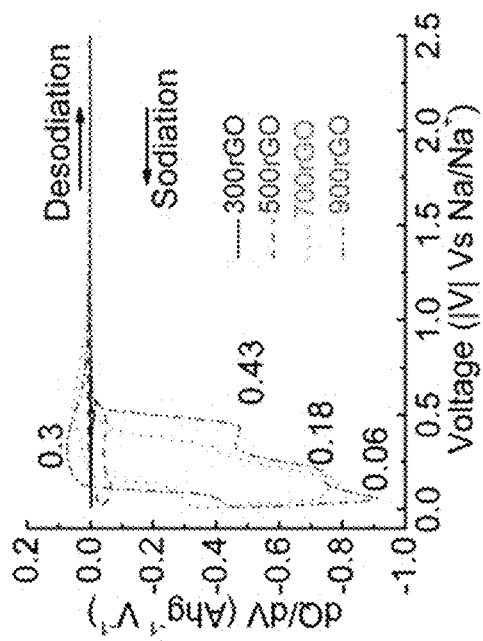
Figure 8A:
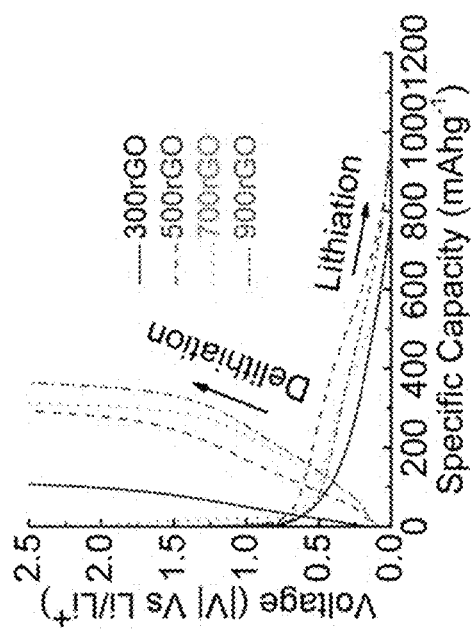
Figure 8C:
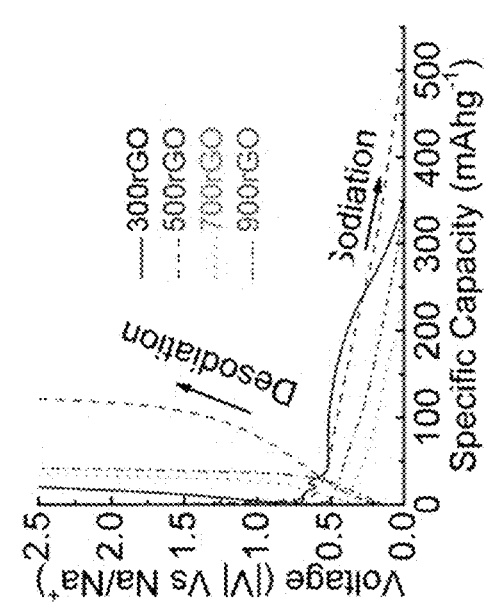
Figure 8E:
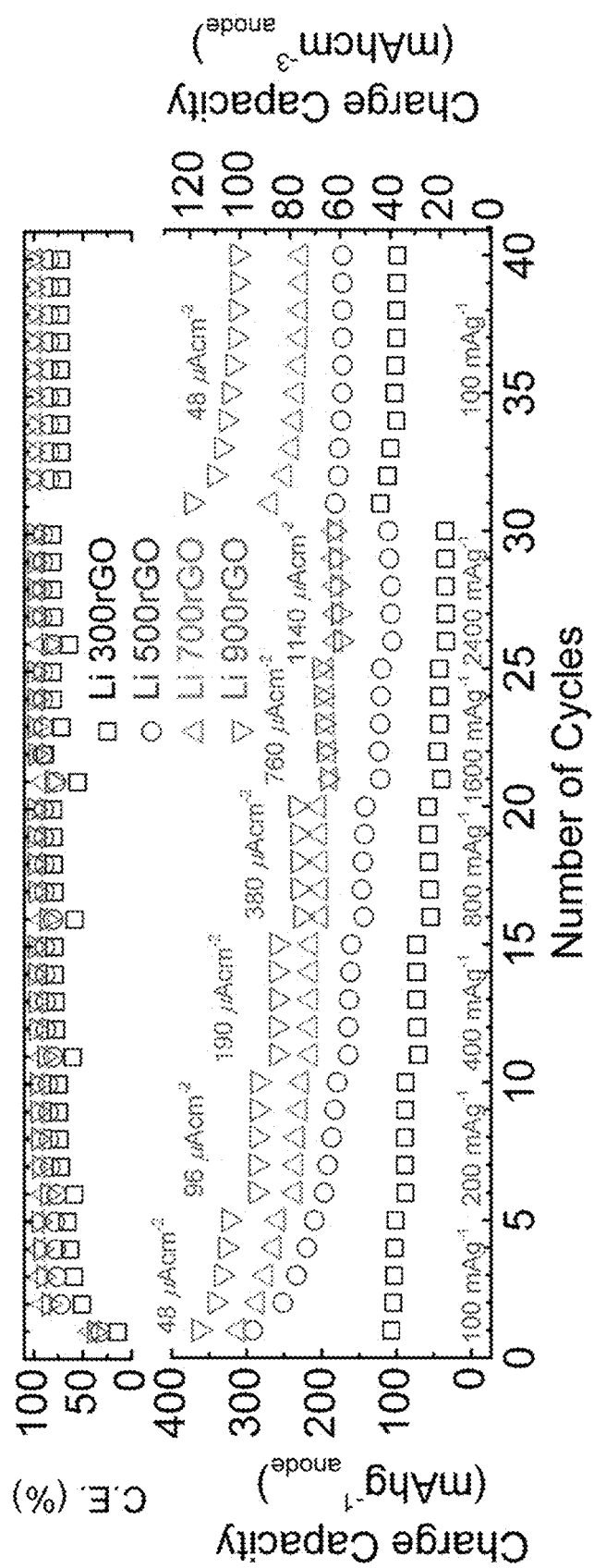
Figure 8F:
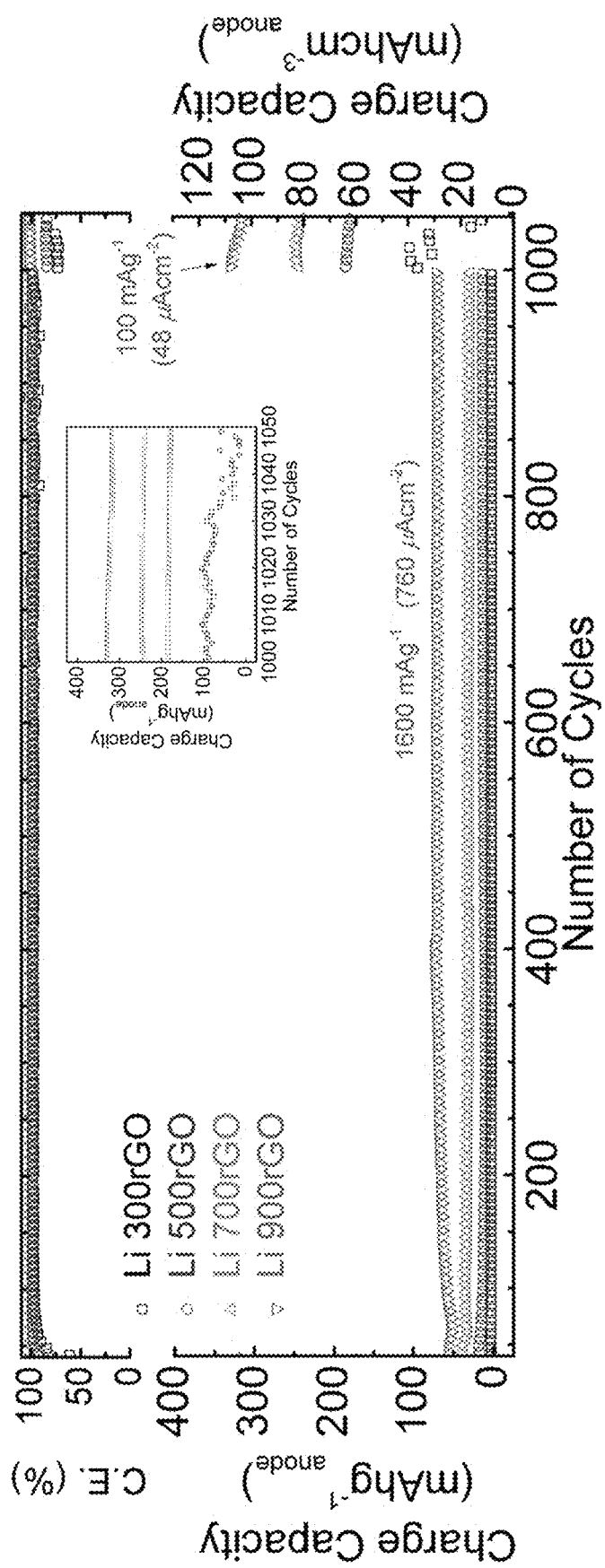
Figure 8G:
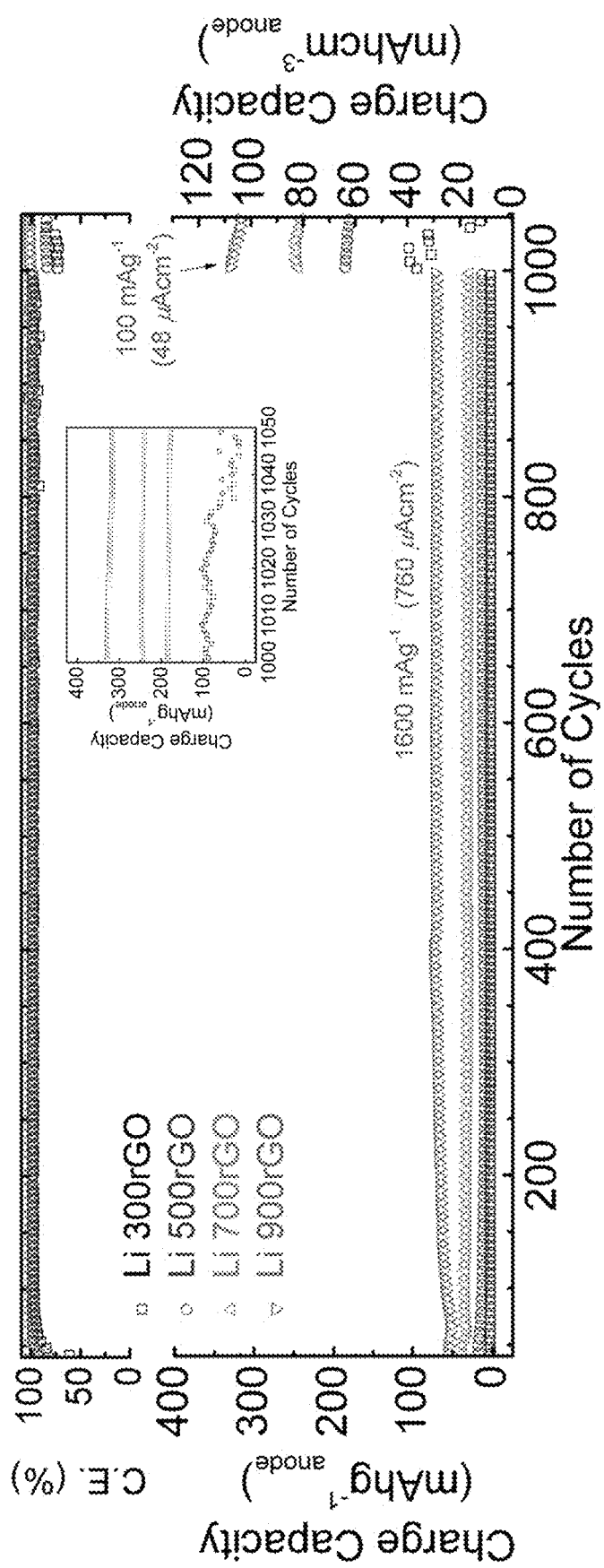
Figure 9:
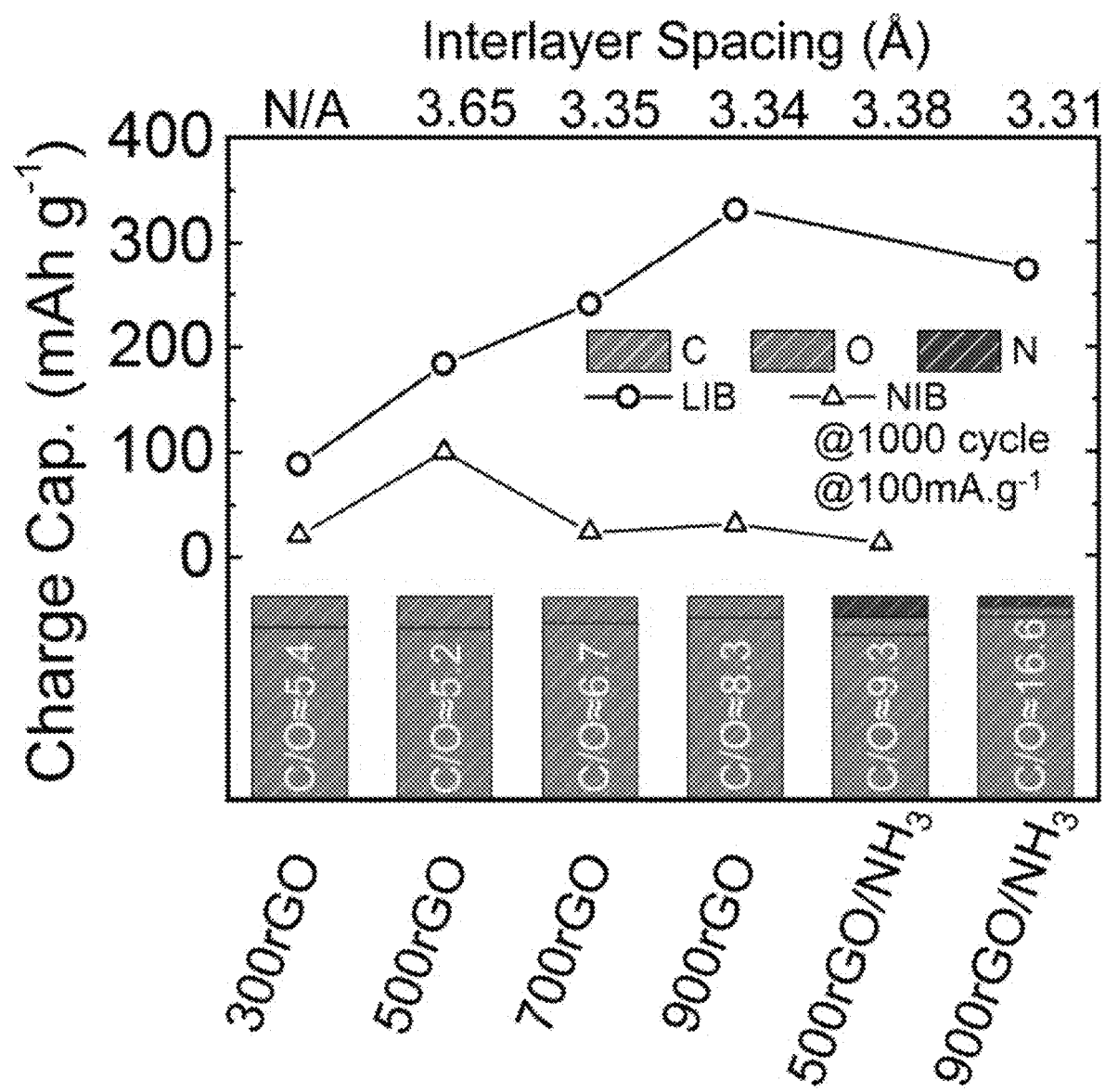
Figure 11A:
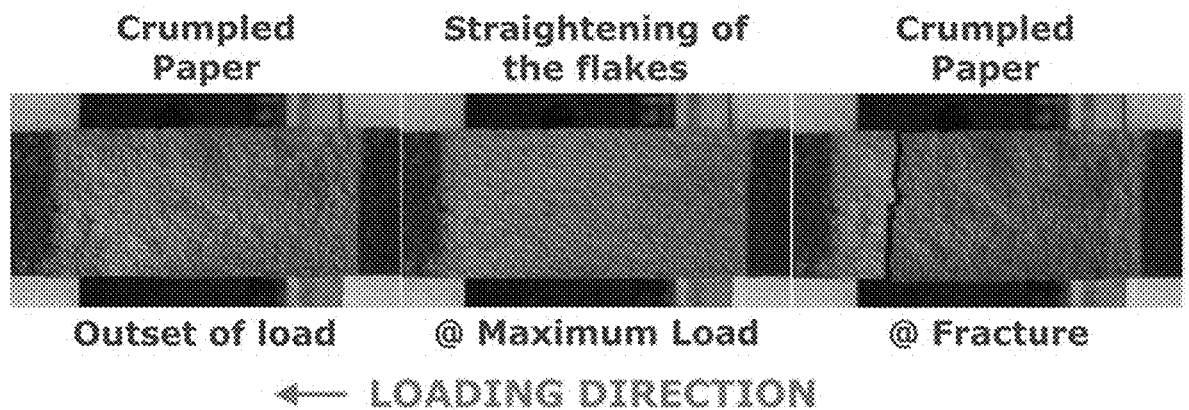
Figure 11B:
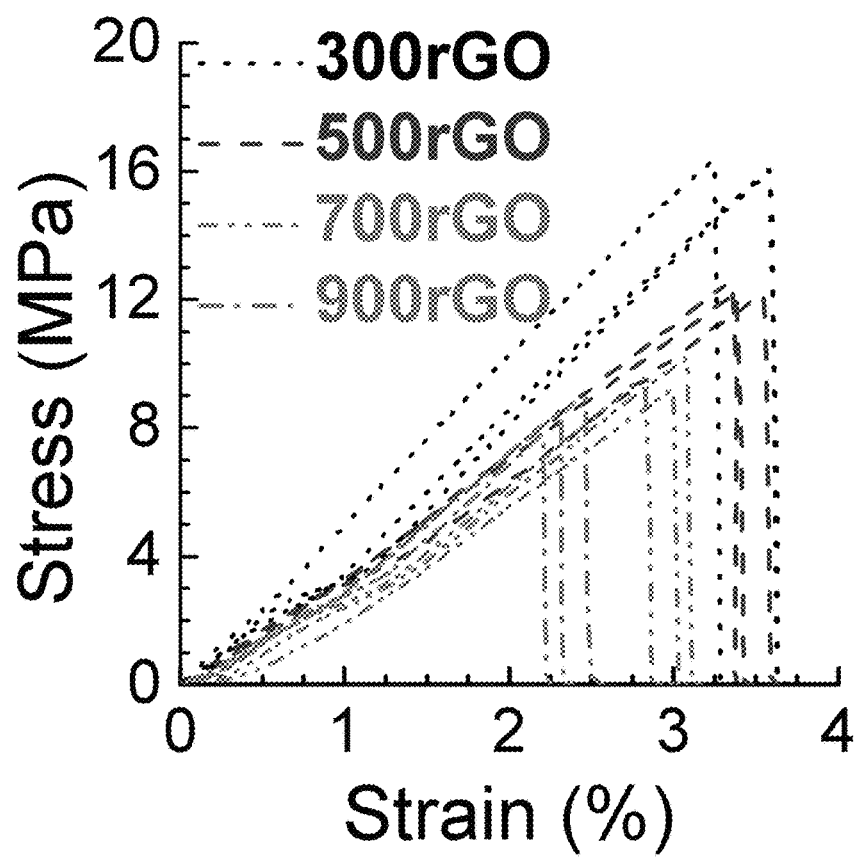
Figure 11C:
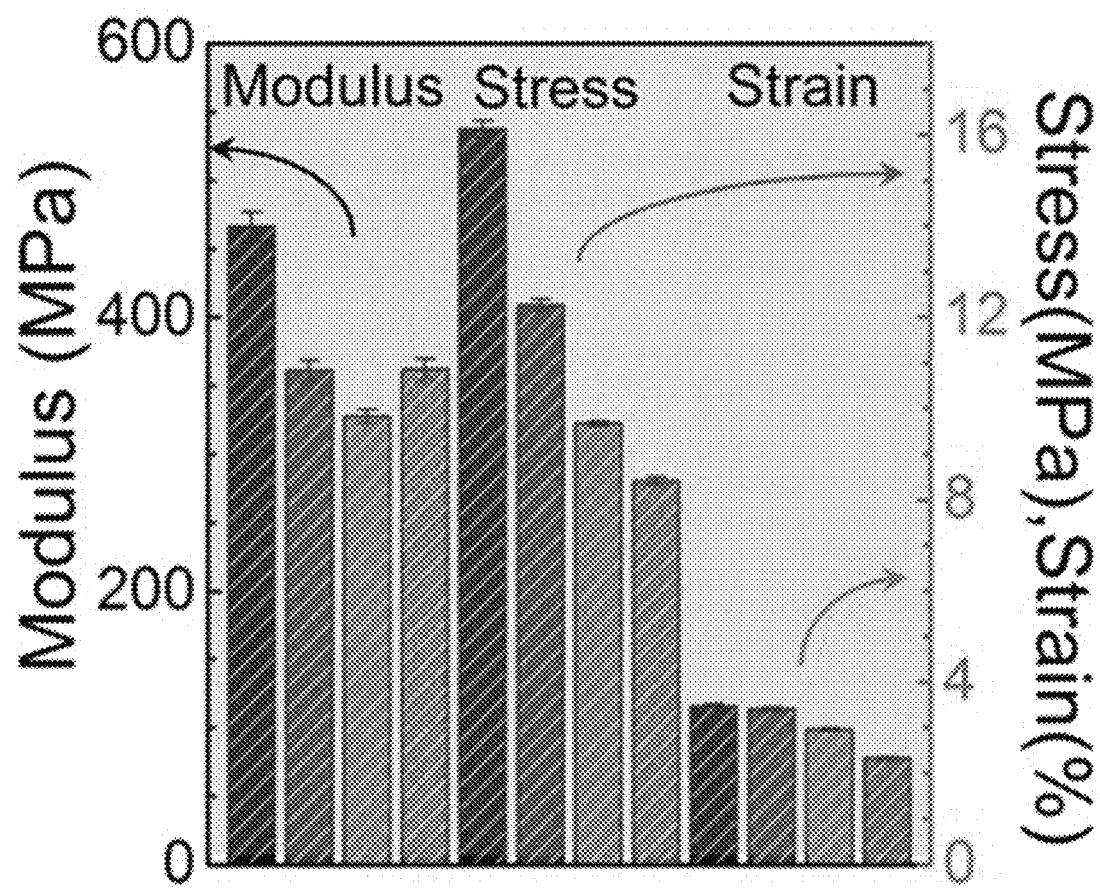

FIGS. 4A, C, E, G, and I depict the voltage profile of rGO, 20MoS$_2$/rGO, 60MoS$_2$ (RAW)/rGO, 60MoS$_2$/rGO and 60MoS$_2$/rGO (annealed in nitrogen), respectively, along with their corresponding differential capacity curves cycled at various current densities depicted in FIGS. 4B, D, F, H, and J, respectively;

FIG. 5 illustrates the charge capacity of all the anodes symmetrically cycled at approx. 25 mA/g along with their cyclic efficiencies;

FIGS. 6A-D show the post-cycle analysis of the cycled anodes via digital camera images of rGO, 20, 50, 70 wt. % MoS$_2$/rGO composite anodes;

FIGS. 6E-H show the post-cycle analysis of the respective cycled anodes via low magnification SEM images;

FIGS. 6I-L are high magnification SEM images of the respective dissembled anodes;

FIGS. 7A-K provide: a comparison of Raman spectra (A) and x-ray diffraction spectra (B) of thermally-reduced GO at different temperatures with GO and graphite; electrical conductivity (C) of all the free-standing papers compared with GO free-standing paper and graphite powder; high-resolution x-ray photoelectron spectra of C1s peak corresponding to (D) 300rGO, (E) 500rGO, (F) 700rGO and (G) 900rGO; and SEM cross-sectional images of (H) 300rGO, (I) 500rGO, (J) 700rGO and (K) 900rGO show the morphology of the paper (average thickness ~10-15)µm; scale bar is 20 µm);

FIGS. 8A-B are comparisons of first cycle charge/discharge and differential capacity curves of 300rGO, 500rGO, 700rGO and 900rGO cycled in Li-ion battery half-cell at 100 mA/g anode, where current densities and capacities are with respect to total electrode weight and total electrode volume;

FIGS. 8C-D are comparisons of first cycle charge/discharge and differential capacity curves of 300rGO, 500rGO, 700rGO, and 900rGO of Na-ion battery half-cell at 100 mA/g anode, where current densities and capacities are with respect to total electrode weight and total electrode volume;

FIG. 8E is a graph of lithium charge capacity and corresponding columbic efficiency of various rGO electrodes asymmetrically cycled at varying current densities, where current densities and capacities are with respect to total electrode weight and total electrode volume;

FIG. 8F is a graph of continued long term symmetric cycling of all the anodes at 1600 mA/g anode for 1,000 cycles, where current densities and capacities are with respect to total electrode weight and total electrode volume;

FIG. 8G is a graph of sodium charge capacity and corresponding columbic efficiency of various rGO anodes symmetrically cycled at varying current densities, where current densities and capacities are with respect to total electrode weight and total electrode volume;

FIG. 9 is a comparison of the 1000$^{th}$ charge capacity data for Li and Na half-cells presented as a function of electrode-annealing temperature and C/O ratio;

FIGS. 10A-F provide post-electrochemical cycling digital, SEM and TEM images, respectively, of the best performing 900rGO-LIB and 500rGO-NIB paper electrodes; and FIG. 11A provides digital camera images at various stages of the loading;

FIG. 11B provides engineering stress-strain plots of 300rGO, 500rGO, 700rGO and 900rGO free-standing papers; and FIG. 11C is a bar chart representing the calculated mean of their modulus, failure stress and failure strain.

DETAILED DESCRIPTION OF THE PREFERRED EMBODIMENTS

As used herein, the term "graphene oxide" refers to an oxide prepared by oxidizing graphite, and thus is understood to include graphite oxide. The graphene oxide has a structure in which a carbon layer includes an oxygen-containing group such as a hydroxyl group, an epoxide group, a carboxyl group, or a ketone group. Graphene oxide is distinguished from graphite in that graphene oxide can be dispersed in a solution, and thus can be formed into a thin layer. That is, when graphene oxide is formed as a thin film by using a graphene oxide dispersion and the thin film is then reduced, graphene in the form of a sheet may be formed. As used herein, "rGO" indicates a compound that was prepared by reducing the graphene oxide.

The term "graphene" as used herein refers to polycyclic aromatic molecules comprising, and preferably consisting of, a plurality of carbon atoms covalently bonded to each other. The covalently bonded carbon atoms may form a 6-membered ring as a repeating unit, or may further include a 5-membered ring and/or a 7-membered ring. Thus, graphene appears as a single layer of covalently bonded carbon atoms (usually, bonded via a sp$^2$ bond). The graphene may have various structures that may vary according to the number of 5-membered rings and/or 7-membered rings.

The graphene may be formed as a single layer of graphene. Alternatively, the graphene may be formed as multiple layers of mono layer graphene sheets stacked upon one another. In this regard, the graphene will typically have a maximum thickness of less than about 100 nm. Generally, the side ends of the graphene are saturated with hydrogen atoms.

The rGO has types and physical properties that are similar to those of the graphene described above, but has somewhat different electrical properties when compared to graphene. In particular, rGO has decreased conductivity when compared to graphene. Additionally, rGO does not have a full graphene structure (C=C/C—C conjugated structure) and has fewer C=C bonds than graphene. In other words, because oxygen atoms or nitrogen atoms are partially mixed between the carbon atoms, the rGO has various band-gaps.

The graphene oxide utilized in the present invention can be prepared by treating graphite with a strong (i.e., having a pKa of less than about −6.0 at 25° C.) acid. In particular, the graphene oxide may be prepared by adding a strong acid (e.g., sulfuric acid) and an oxidizing agent (e.g., potassium permanganate) to graphite, heating the mixture to induce a reaction therebetween, cooling the reaction product to room temperature, and adding an oxidizing agent such as hydrogen peroxide thereto to oxidize the graphite.

Turning now to the various embodiments of the present invention, in one embodiment the invention is concerned with a reduced graphene oxide material that has a high storage capacity for sodium ions. This composition is useful as an electrode and is formed by heating a graphene oxide composition at a temperature of from about 450° C. to about 550° C., more preferably from about 480° C. to about 520° C., and even more preferably about 500° C. This heating is preferably carried out for a time period of from about 60 minutes to about 180 minutes, more preferably from about 90 minutes to about 150 minutes, and even more preferably from about 110 minutes to about 130 minutes. Preferably, the graphene oxide composition that is heated in this embodiment consists essentially of, or even consists of, graphene oxide. That is, the composition is at least about 97%, preferably at least about 99%, and even more preferably about 100% graphene oxide. This results in an electrode that preferably consists essentially of, or even consists of, reduced graphene oxide. Furthermore, the final electrode of this embodiment is at least about 97%, preferably at least about 99%, and even more preferably about 100% reduced graphene oxide.

The reduced graphene oxide formed by the above process can be used as a high-sodium storage capacity electrode. The electrode can take any shape or form desirable for the particular final use, including those selected from the group consisting of free-standing papers, films, tapes, and painted coatings. The electrode will have a sodium capacity of at least about 110 mAh/g, preferably at least about 130 mAh/g, more preferably at least about 150 mAh/g, even more preferably at least about 170 mAh/g, and even more preferably from about 170 mAh/g to about 400 mAh/g for at least about 40 cycles. The "mAh/g" is with respect to the total weight of the electrode or the material that will be used to form an electrode (e.g., the pure rGO or the composites described below), as appropriate in the particular context. Additionally, any use of the "/g" or "$g^{-1}$" herein is intended to refer to this weight basis, even if not specifically mentioned.

While the above embodiment is concerned with non-composite electrodes, in further embodiments the invention provides composite electrodes. More particularly, the invention provides an SIB composite electrode that comprises rGO and a redox component. In particular embodiments, the redox component can include transition metal dichalcogenides (TMDCs). The dichalcogen of the TMDC can include dichalcogens of chalcogen atoms selected from the group consisting of S, Se, and Te, with S (i.e., a disulfide) being particularly preferred. Any transition metal is suitable, including those selected from the group consisting of Mo, W, Fe, HF, and Sn, with Mo being particularly preferred. The most preferred such TMDC is $MoS_2$.

Other embodiments of the present invention concern methods for fabricating a well-organized interleaved free-standing composite anode comprising $MoS_2$ particles or exfoliated flakes (nano-flakes) supported on an rGO matrix. In certain embodiments, graphene oxide sheets readily form good dispersions in water, which may be mixed with $MoS_2$ nano-flakes by sonication. In such embodiments, filtering such mixture can form homogeneously-layered nanocomposite paper with $MoS_2$ nano-flakes trapped between the GO layers, which may then be reduced by heat treatment to an $MoS_2$/rGO composite material. In certain embodiments, the heat treatment can include thermal reduction at 500° C. under argon for about 2 hours.

In certain methods according to the present invention, $MoS_2$ is added to the graphene oxide dispersion in an amount of at least about 1%, 5%, 10%, 20%, 30%, 40%, 50%, 55%, or 60% by weight, based upon the combined dry weight of the graphene oxide and $MoS_2$ materials. In other embodiments, the $MoS_2$ is added to the graphene oxide dispersion in an amount no more than about 95%, 90%, 80%, 70%, 65%, 60%, 50%, 40%, 35%, or 30% by weight, based upon the combined dry weight of the graphene oxide and $MoS_2$ materials. In one or more embodiments, the GO/$MoS_2$ dispersion can comprise $MoS_2$ in an amount ranging from about 1% to about 90%, preferably from about 20% to about 85%, more preferably from about 35% to about 80%, and even more preferably from about 60% to about 75% by weight, based upon the combined dry weight of the graphene oxide and $MoS_2$ materials.

Following filtering and heat treatment, the rGO/$MoS_2$ composite material may comprise $MoS_2$ in an amount of at least about 1%, 5%, 10%, 20%, 30%, 40%, 50%, 55%, or 60% by weight. In other embodiments, the rGO/$MoS_2$ composite material may comprise $MoS_2$ in an amount no more than about 95%, 90%, 80%, 70%, 65%, 60%, 50%, 40%, 35%, or 30% by weight. In particularly preferred embodiments, the rGO/$MoS_2$ composite material comprises $MoS_2$ in an amount ranging from about 1% to about 90%, preferably from about 20% to about 85%, more preferably from about 35% to about 80%, and even more preferably from about 60% to about 75% by weight.

In various embodiments, the rGO/$MoS_2$ composite material can include rGO in an amount ranging from about 5% to about 50%, preferably from about 10% to about 40%, and more preferably from about 15% to about 30% by weight.

In one or more embodiments, the rGO/$MoS_2$ composite material can include $MoS_2$ particles/flakes positioned between flat, sheet-like layers of the rGO material, thereby forming an rGO/$MoS_2$ paper. In various embodiments, the rGO/$MoS_2$ paper can have a thickness ranging from about 10 μm to about 100 μm, and more preferably from about 10 μm to about 20 μm. In certain embodiments, an rGO/$MoS_2$ paper having a diameter of approximately 14.3 mm can have a weight of from about 8 mg to about 30 mg, preferably from about 10 mg to about 25 mg, more preferably from about 13 mg to about 22 mg, and even more preferably from about 15 mg to about 20 mg. Thus, the rGO/$MoS_2$ composite material may have a density of between about 1 $g/cm^3$ to about 25 $g/cm^3$, preferably between about 1.5 $g/cm^3$ to about 10 $g/cm^3$, and more preferably about 2 $g/cm^3$ to about 5 $g/cm^3$.

With its large surface area, rGO can serve as the ideal host material to the semiconducting $MoS_2$ particles/nano-flakes between its layers, providing the necessary electronic path and consistent performance at high current densities, and structural stability. The rGO can, advantageously provide Na storage capacity for the anode while simultaneously achieving the foregoing, while the $MoS_2$ particles offer further Na storage capacity for the anode.

Certain embodiments of the present invention concern the synthesis of free-standing composite paper made of $MoS_2$ particles or nano-flakes intercalated in graphene sheets. In this composite material, rGO can serve as an effective current collector and electron conductor with a stable chemical and mechanical structure. In certain embodiments, this flexible, free-standing paper (rGO/$MoS_2$ paper) does not include the copper current collector typically used in a rechargeable battery. In one or more embodiments, an SIB anode comprising rGO/$MoS_2$ paper is essentially free of (i.e., less than about 1% by weight, and preferably less than about 0.5% by weight) or preferably does not include (i.e., about 0% by weight) a conductive polymeric binder or conducting agent.

In various embodiments, the rGO material is used to embed $MoS_2$ particles or flakes, which can actively cycle Na-ions. In one or more embodiments, the rGO/$MoS_2$ composite electrode can exhibit a stable charge capacity (anode) of at least about 200 mAh/g (with respect to the total weight of the electrode), preferably at least about 225 mAh/g, and more preferably from about 225 mAh/g to about 250 mAh/g, with excellent cyclability of Na+ without any appreciable (i.e., less than about 10%, and preferably less than about 5%) degradation in the 0.10 V to 2.25 V range (versus Na/Na+) for up to at least about 50 cycles at room temperature. In one or more embodiments the rGO/$MoS_2$ composite electrode can exhibit a stable charge capacity (anode) at temperatures of about −15 degrees Celsius.

The SIB composite anodes of the present invention may be used in many devices, including those selected from the group consisting of batteries for personal electronics, vehicle batteries, and aircraft batteries. In certain embodiments, the SIB composite anodes of the present invention may be used in any size and/or shape SIB, such as, coin cells or cylindrical cells. In various embodiments, the SIB composite anode can comprise rGO/MoS$_2$ paper having a maximum diameter ranging from about 1 mm to about 100 mm, preferably from about 5 mm to about 80 mm, or more preferably from about 10 mm to about 70 mm. In certain other embodiments, the rGO/MoS$_2$ paper can have a maximum diameter of at least about 5 mm, about 10 mm, about 50 mm, about 100 mm, or about 500 mm. It should be understood that these ranges and values of the size of the rGO/MoS$_2$ paper are non-limiting, and that larger or smaller rGO/MoS$_2$ papers are also contemplated by this invention. Further, it should be understood that the maximum diameter refers to the longest straight line extending from one point on the edge of the rGO/MoS$_2$ paper to another point on the edge of the rGO/MoS$_2$ paper passing through the center point, and does not necessarily require the rGO/MoS$_2$ paper to be circular or cylindrical in shape.

Materials and Instrumentation

Sodium nitrate (99.2%), potassium permanganate (99.4%), sulfuric acid (96.4%), hydrogen peroxide (31.3% solution in water), hydrochloric acid (30% solution in water), and methanol (99.9%) were purchased from Fisher Scientific. All materials were used as received without further purification.

Scanning electron microscopy (SEM) of the synthesized material was carried out on a Carl Zeiss EVO MA10 system with incident voltage of 5 KV to 30 KV. TEM images were digitally acquired by use of a Phillips CM100 operated at 100 KV. Material characterization was made using X-ray diffractometer (XRD) operating at room temperature, with nickel-filtered CuKα radiation (k=1.5418 Å).

Raman spectra were measured utilizing a LabRAM ARMIS Raman spectrometer using 633 nm laser excitation (laser power of 17 mW) as the light source. Electrical conductivity measurements were carried out by use of a four-point probe setup and Keithley 2636A (Cleveland, Ohio) dual channel sourcemeter in the ohmic region. The surface chemical composition was studied by X-ray photoelectron spectroscopy (XPS, PHI Quantera SXM) using monochromatic Al Kα X-radiation. Static uniaxial in-plane tensile tests were conducted in a simple test setup. The sample strip was secured on one end by a computer-controlled movable stage (M-111.2DG from PI), while the other end was fixed to a 1N load cell (ULC-1N Interface), which in turn was fixed to an immovable stage. All tensile tests were conducted in controlled strain rate mode with a strain rate of 0.2% min$^{-1}$. The samples were cut with a razor into rectangular strips of approximately 5×15 mm$^2$ for testing without further modification. Electrochemical cycling of the assembled cells was carried out using multi-channel battery test equipment (Arbin-BT2000, Austin, Tex.) at atmospheric conditions.

Example 1

Preparation of Graphene Oxide

A modified Hummer's method was used to make graphene oxide. That is, concentrated H$_2$SO$_4$ (130 mL) was added to a mixture of graphite flakes (3 g) and NaNO$_3$ (1.5 g). The mixture was cooled using an ice bath. KMnO$_4$ was added slowly to this mixture. The mixture was stirred for 12 hours at 50° C., after which it was quenched with water (400 mL) with 30% H$_2$O$_2$ (3 mL) while in an ice bath so that the temperature did not go beyond 20° C. The remaining material was then washed in succession with 200 mL of water twice, 200 mL of 30% HCl, and 200 mL of ethanol. The material remaining after these extended washes was coagulated with 200 mL of ether and filtered through a paper filter. The filtrate was dried overnight to obtain dry graphene oxide (GO).

Example 2

Preparation of Exfoliated MoS$_2$ Flakes

MoS$_2$ powder (2 mg/mL, 99%, Sigma Aldrich) was sonicated for 30 min in concentrated chlorosulphonic acid (superacid, 99%, Sigma Aldrich), and the nonexfoliated sheets were allowed to settle. More specifically, the superacid was slowly added to the MoS$_2$ powder in an argon-filled glovebox (dew point −50° C.). The solution was then carefully transferred in 1.0 L of distilled water for quenching (done with extreme caution in a glovebox). Additional dilution with DI water was done to reduce the solution acidity.

Example 3A

Preparation of Reduced GO and MoS$_2$ Composite Paper

In this Example, 20 mL colloidal suspension of the GO from Example 1 in 1:1 (v/v) water and isopropanol was made by sonication for 10 minutes. The MoS$_2$ material (prepared as described in Example 2) was added to this solution, and the solution was further sonicated for 60 minutes and stirred for 6 hours for homogenous mixing. The composite suspension was then filtered by vacuum filtration though a 10-µm filter membrane (HPLC grade, Millipore). The GO/MoS$_2$ composite paper obtained was carefully removed from the filter paper and dried. This dry paper then underwent thermal reduction at 500° C. under argon atmosphere for 2 hours. The heat-treated paper was then punched into small circles and was directly used as electrode material in the Na-ion battery half-cell. The samples were labeled as rGO, 20 MoS$_2$, 50 MoS$_2$, 70 MoS$_2$ and 90 MoS$_2$ for pristine rGO paper and rGO with 20, 50, 70 and 90 weight % of MoS$_2$ in the total weight of the paper, respectively.

Example 3B

Preparation of Free-Standing GO Paper

In this Example, a 10-mL colloidal suspension of the GO from Example 1 in 1:1 (v/v) water was prepared by first sonicating for 10 minutes. Once the suspension was made, it was filtered by vacuum filtration though a 10-µm filter membrane. The free-standing paper obtained was carefully removed from the filter paper and dried. This dry paper then underwent reduction by heat treatment in a tube furnace at various reduction temperatures, ranging from 300° C. to 900° C., under high purity Ar or NH$_3$ for 2 hours. The thermal reduction process resulted in conversion of GO to rGO. The reduced paper was then punched into small circles and used as working electrodes for LIB and SIB half-cells. Loading was approximately 0.75 to 4 mg/cm.

Example 4A

Coin Cell/Battery Assembly of GO/MoS$_2$ Composite Paper

For electrochemical testing, 2032 half coin cells were made by punching 14.3-mm diameter pieces out of the composite paper of Example 3A for use as the negative electrode in the cell. A few drops of electrolyte solution of 1 M NaClO$_4$ in (1:1 v/v) dimethyl carbonate:ethylene carbonate (ionic conductivity 10.7 mS/cm) was used. A 25-μm thick (19-mm diameter) glass separator soaked in the electrolyte was placed between the anode and pure sodium foil (14.3-mm diameter, 75-μm thick) counter electrode. Washer, spring, and a top casing were placed on top to complete the assembly before crimping. Electrochemical performance of the battery was tested using a multichannel BT2000 Arbin test unit sweeping between 2.25 V to 10 mV vs Na/Na$^+$ at approximately 25 mA/g.

Example 4B

Coin Cell/Battery Assembly of rGO Paper

Half-cell batteries were in a manner similar to that described in Example 4A, but using the paper of Example 3B.

Electrochemical performance of the assembled coin cells of this Example was tested using a multichannel BT2000 Arbin test unit sweeping between 2.5 V to 10 mV vs Li/Li$^+$ or Na/Na$^+$ using the following cycle schedule: (a) Asymmetric mode: Li or Na was inserted at 100 mA/g (based on total electrode weight), while the extraction was performed at increasing current densities of 100, 200, 400, 800, 1600, and 2400 mA/g anode for 5 cycles each, and returning back to 100 mA/g anode for the next 10 cycles; and (b) Symmetric mode: Later, all the cells were subjected to symmetric cycling at a current density of 1,600 mA/g anode for up to 1,000 cycles, returning back to 100 mA/g anode for the last 50 cycles.

RESULTS AND DISCUSSION

Go/MOS$_2$ Composite Paper

During acid functionalization of MoS$_2$, the superacid protonates the MoS$_2$ surfaces, and these charged surfaces can experience electrostatic repulsion forces and form a stable dispersion in aqueous solution (also observed visually). Additionally, ζ potential measurements can quantify this surface charge existing on MoS$_2$ sheet surfaces and hence assist in establishing the dispersion stability. The ζ potential measured at varying solution pH with the same MoS$_2$ concentration provided an understanding of the pH-dependent MoS$_2$ sheet stability in the solution. Hence, a separate solution of 1 mg/mL MoS$_2$ in superacid (top portion) was used for ζ potential measurements. The surface potential showed a range varying from −1.67 mV at pH of 3 to −36.3 mV at a pH of 10, shown as an insert in FIG. 3 (TOP). As higher surface potential (negative) implies more stable suspensions, based on the obtained results, higher pH suggests a larger exposed MoS$_2$ sheet surface.

For ζ potential measurements, the pH was varied by adding 0.01 M NaOH solution. Also, because the contribution from dissociated OH$^-$ ions in the measured potential is minimal, it was neglected in the analysis. The lower pH range was limited to protect the instrument electrode.

Accordingly, the total potential energy ($V_T$) at the surface interaction of two adjacent MoS$_2$ sheets is the difference in repulsive potential energy ($V_{DLvo}$) and attractive van der Waals energy $V_{vdW}$). $V_{DLVO}$ for MoS$_2$ surfaces is determined using the measured ζ potential, surfactant concentration, and distance between two separated sheets, and $V_{vdw}$ is calculated using atomic density and surface energy. The total potential energy is then given by $V_T \approx V_{DLVO} - V_{vdW} = 4A\varepsilon_r\varepsilon_{0K}\zeta^2 e^{-\kappa D} - A\pi \rho^2 C/2D^4$, where A is the area of MoS$_2$ sheet, p is the number of atoms per unit area, and $\varepsilon_r$ and $\varepsilon_0$ are the relative permittivity of water (80.1 at 20° C.) and the absolute permittivity (8.85×10$^{-12}$ F/m), respectively. Additionally, ζ is the experimentally measured surface potential (36.3 mV), D is the distance of sheet separation, $\phi^2 C$ is the estimated surface energy per unit area (approximately 2.06×10$^{-38}$ J/m$^2$), and κ is the double-layer thickness given as $1/[\varepsilon_r\varepsilon_0 kT/2e^2 n_0]^{0.5}$ (n$_0$=9.05×10$^{23}$ is the number of surfactant molecules per unit volume of solution; e=1.6× 10$^{-19}$ C). FIG. 3 is the plot for total interaction energy per unit area of the sheet ($V_T/A$).

Morphology of the GO/MoS$_2$ Composite Paper

SEM images in FIGS. 2A-J show the top view and cross-sections of rGO (FIGS. 2A and F), 20MoS$_2$ (FIGS. 2B and G), 50MoS$_2$ (FIGS. 2C and H) and 70MoS$_2$ (FIGS. 2D and I) composite papers, respectively. The papers were approximately 10- to 100-μm thick, with a relatively homogeneous composition. The open structure observed in the cross-sectional images is good for large sodium ions to intercalate and deintercalate easily even when higher current densities are applied. The insert in FIGS. 2A-D shows digital photographs that show the outstanding structural flexibility of the rGO and rGO/MoS$_2$ composite paper. Corresponding TEM images in FIGS. 2K-O show that the GO sheets layered well, with few layers of MoS$_2$, thus forming a very good electron conductive layer and also a support structure for the free-standing paper. The insert in FIGS. 2K and O shows the selected area electron diffraction (SAED) pattern obtained from the spot indicated with a red circle in their corresponding images. The hexagonal spot pattern, in the insert of FIG. 2K, indicates that the graphitic AB stacking is preserved in the lattice after thermal reduction. For the SAED pattern in FIG. 2O, the multiple spot pattern was due to the polycrystallinity of restacked rGO sheets, while a second set of spot patterns were also observed due to the MoS$_2$ sheets.

Figure 1:
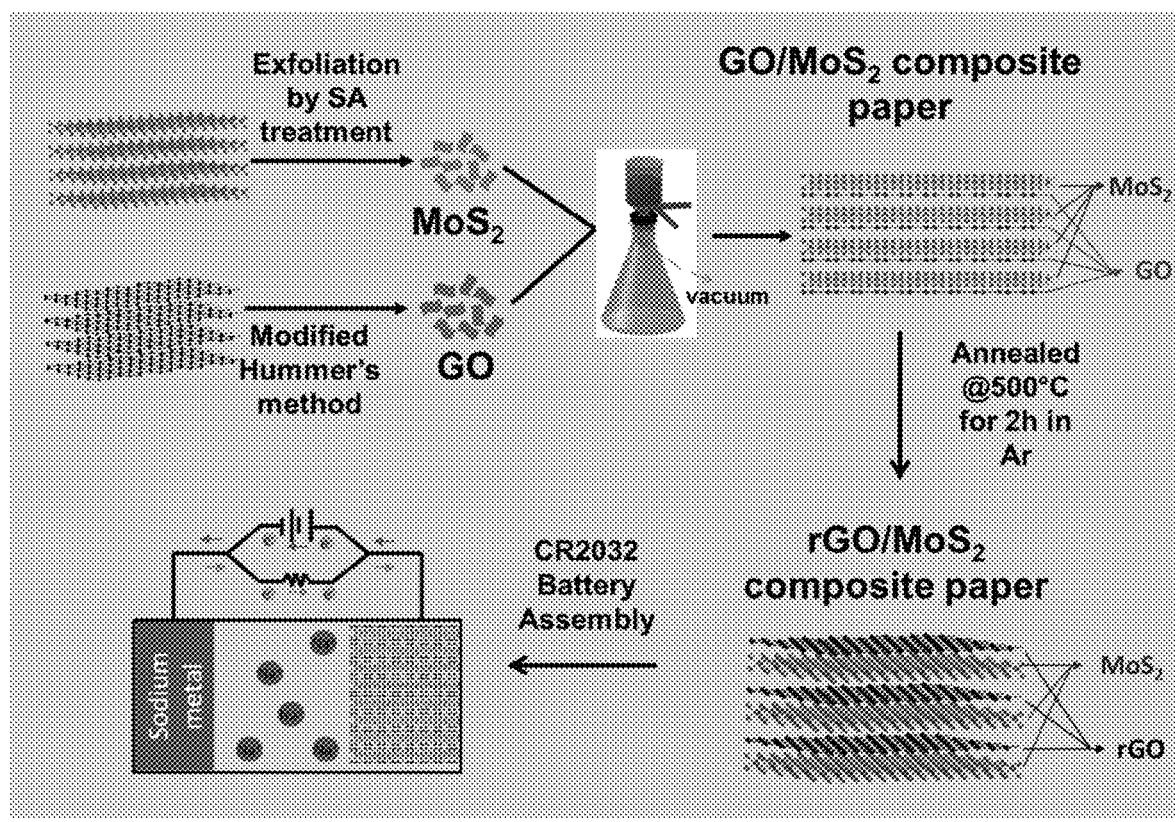
Figures 2A, 2B, 2C, 2D, 2E:
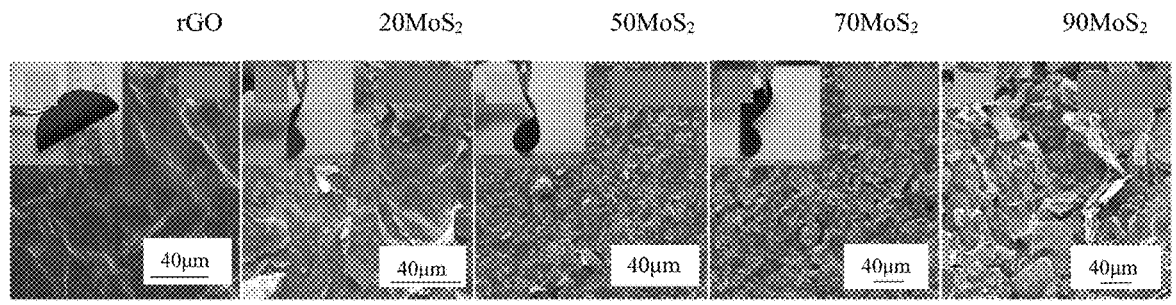
Figures 2F, 2G, 2H, 2I, 2J:
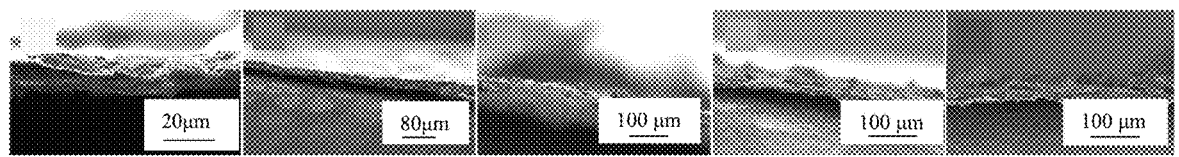
Figures 2K, 2L, 2M, 2N, 2O:
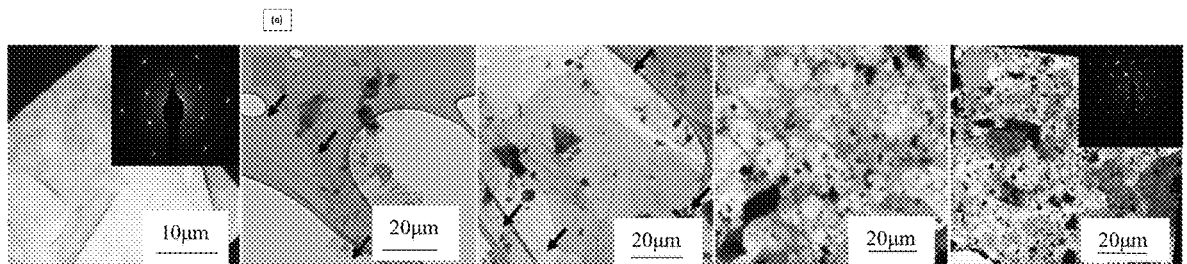
Figure 3A:
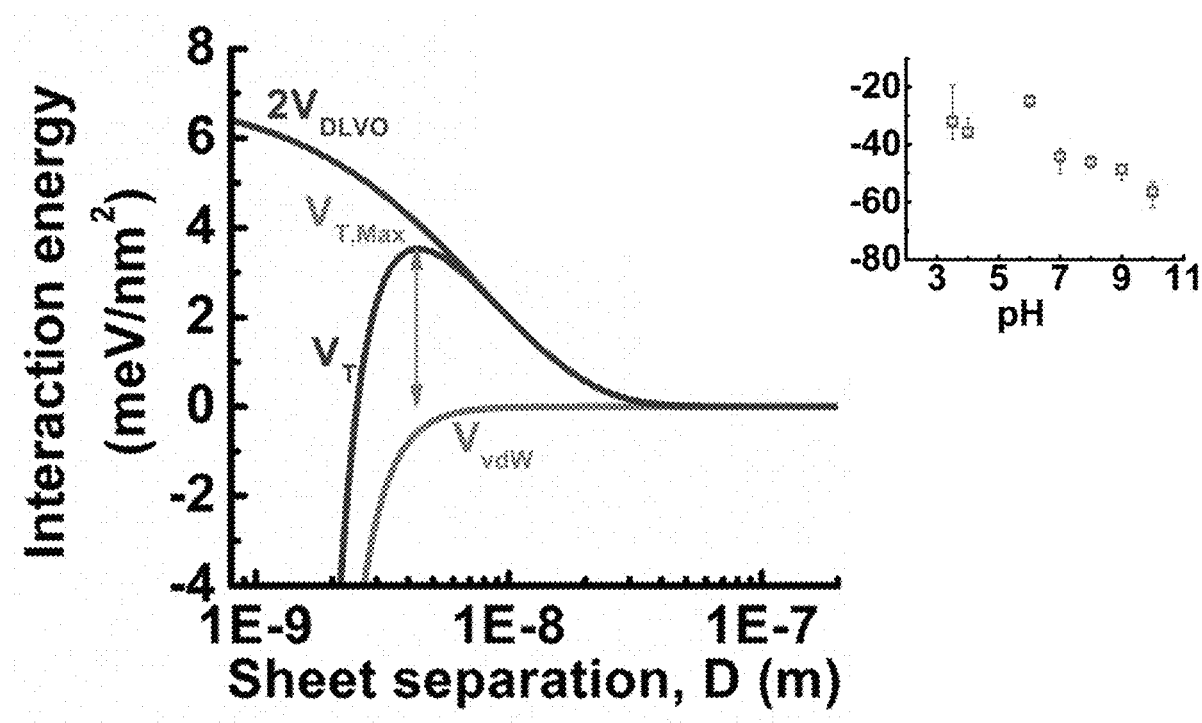
FIG. 3A shows the calculated total interaction potential energy ($V_T$), repulsion ($V_{DLVO}$), and attraction energy ($V_{vdW}$) (per unit area) with increasing MoS$_2$ sheet separation distance (log scale) is shown; (inset) experimentally measured zeta potential measurements, showing better dispersion stability at higher pH values.
Figure 3B:
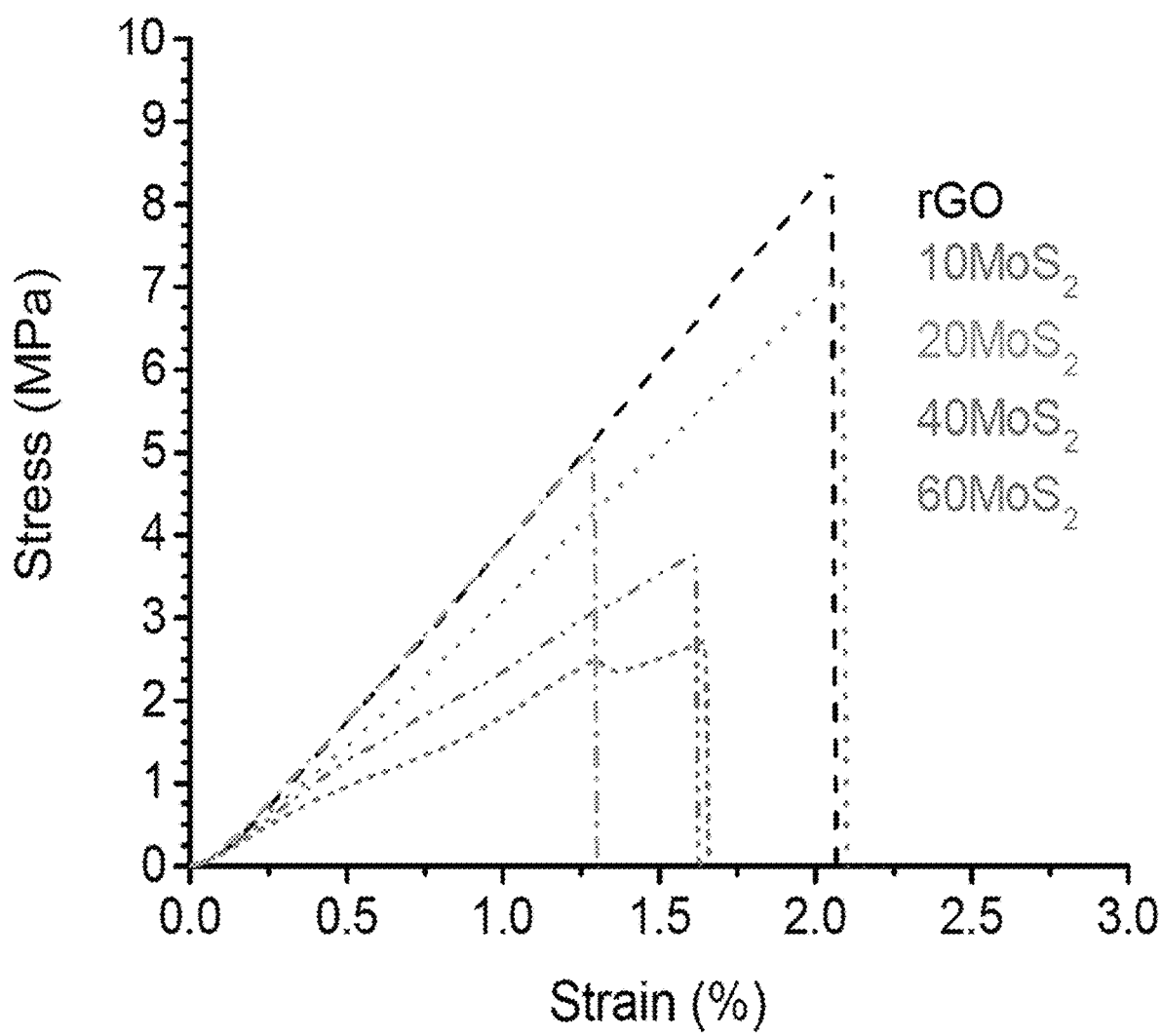
FIG. 3B is a graph of tensile testing data for MoS$_2$/rGO composite papers with varying wt. % of MoS$_2$ in rGO.

FIG. 3A shows the calculated total interaction potential energy ($V_T$), repulsion ($V_{DLVO}$), and attraction energy ($V_{vdW}$) (per unit area) with increasing MoS$_2$ sheet separation distance (log scale) is shown; (inset) experimentally measured zeta potential measurements, showing better dispersion stability at higher pH values. Tensile tests of the papers were determined in order to quantify the strength of the free-standing paper. Three strips were measured per sample for free-standing films. Tensile testing data is included in FIG. 3B.

Figure 4D:
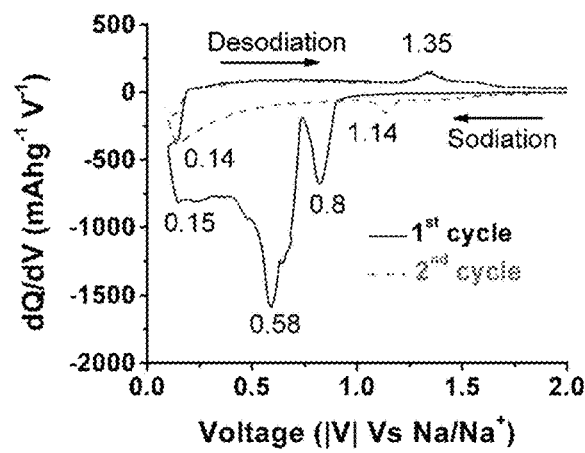
Figure 4E:
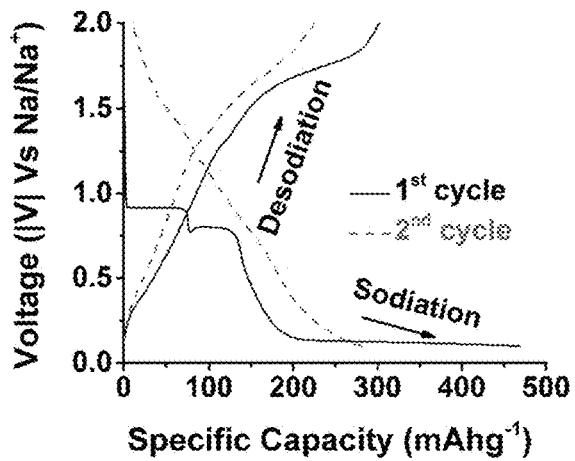
Figure 4F:
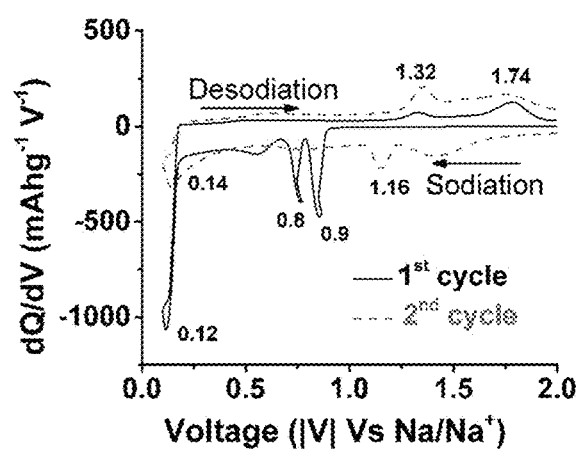
Figure 4G:
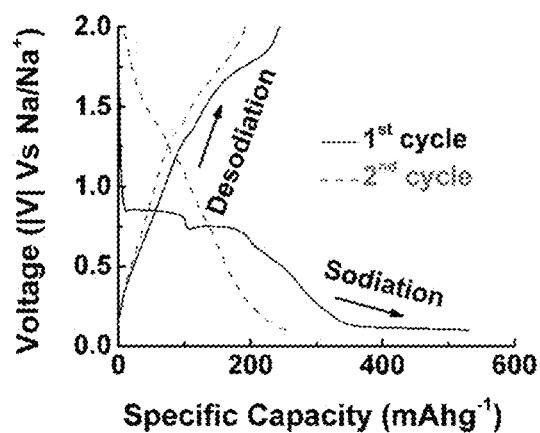
Figure 4H:
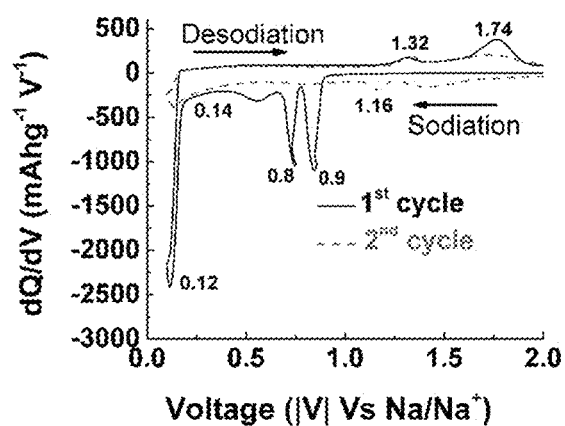
Figure 4I:
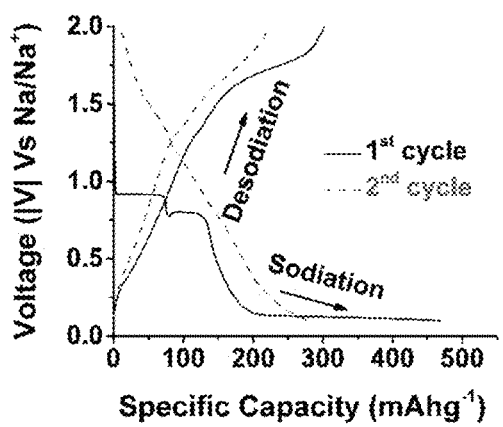
Figure 4J:
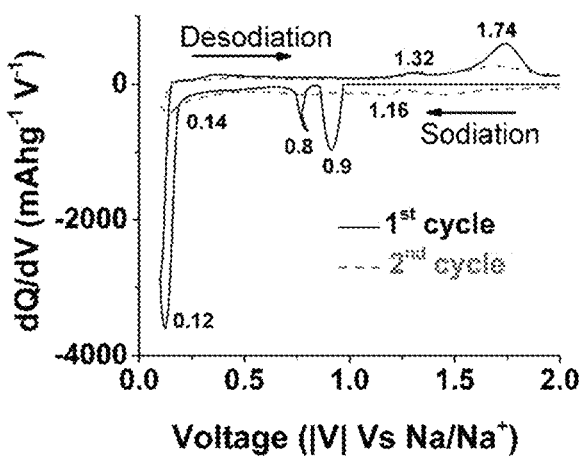

FIGS. 4A-J show the charge/discharge curves and differential capacity curves for rGO (FIGS. 4A and B) and rGO/MoS$_2$ (FIGS. 4C-J) with varying MoS$_2$ content. FIG. 4A shows the voltage profiles of rGO for 1$^{st}$ and 2$^{nd}$ cycle. The first cycle discharge and charge capacities were 784 mAh/g and 86 mAh/g. The differential capacity profiles in FIG. 4B showed a primary reduction peak at 200 mV, a secondary reduction peak at 610 mV, and a weak oxidation peak at 0.9 V. The peak at 200 mV, which was present in all subsequent cycles, is associated with intercalation of rGO, while the peak at 610 mV signifying SEI formation, which existed only in the first cycle. FIGS. 4D, F, H, and J show the differential capacity curves of $1^{st}$ and $2^{nd}$ cycle of $MoS_2$/rGO. In the first cycle, there were three reduction peaks at around 150 mV attributed to $MoS_2$/rGO intercalation. Peaks at 580 mV and 1.8 V are attributed to SEI formation in rGO and $MoS_2$, respectively, as these peaks were present only during the first cycle. Only one subtle anodic peak at 1.35 V was observed. As the percentage of $MoS_2$ increases, the domination of $MoS_2$—Na reaction increases, which was evidently seen with an increase in intensity of the reduction peak at around 0.8 V and 0.9 V in the first cycle when compared to the rGO peak at 600 mV.

FIG. 5 shows the charge capacities and columbic efficiency of rGO, $20MoS_2$, $60MoS_2$, anodes cycled at 25 mA/g. For rGO, the $1^{st}$ cycle charge capacity was observed at ~81.5 mAh/g, which was stable at ~70.5 mAh/g in the $40^{th}$ cycle. The high irreversible first cycle capacity resulted from a electrochemical reaction contributing to solid-electrolyte interphase (SEI) layer formation. In the case of a rGO/$MoS_2$ composite, the first cycle charge capacity increased corresponding to the percentage of $MoS_2$ present in the mixture.

To check the integrity of the anode, the cells were disassembled, and the anodes recovered for further characterization. FIGS. 6A-D show digital photographs of the anodes after 40 cycles. FIGS. 6E-H show low resolution SEM images of the anodes after 40 cycles. FIGS. 6I-L show high resolution SEM images of the anodes after 40 cycles. No evidence of surface cracks, volume change, or physical imperfections were observed in the SEM image, suggesting mechanical/structural strength of the rGO/$MoS_2$ composite paper. In all cases, the evidence of SEI formation due to repeated cycling of Na ions could be observed. The contamination in the specimen indicated by the arrows was from the residue of glass separator fibers. Also, these anodes had been exposed to air during the transfer process, resulting in oxidation of $Li^+$ ions, which appeared as bright spots in the images (due to its non-conducting nature).

Conclusions Pertaining to GO/$MoS_2$ Composite Paper

The present invention successfully formed composite layered paper comprising exfoliated $MoS_2$ nanoflakes in an rGO matrix. Mechanical tests revealed exceptional mechanical strength (from about 3 to about 5 MPa fracture strength) and very low failure strain (less than about 1.5%) in these materials. Further, the composite paper was directly utilized as a binder-free, electrically-conducting electrode in a Na+ battery half-cell as a counter electrode and its performance was evaluated as a potential anode for Na+ battery full cell. These tests revealed a high electrochemical capacity of 250 mAh/g at the anode level, with excellent cyclability of Na+ without any appreciable degradation in the 0.10 to 2.25 V range (versus Na/Na+) for up to at least about 50 cycles at room temperature.

Results and Discussion rGO Paper (I) Chemical and Structural Analysis

Figure 7A:
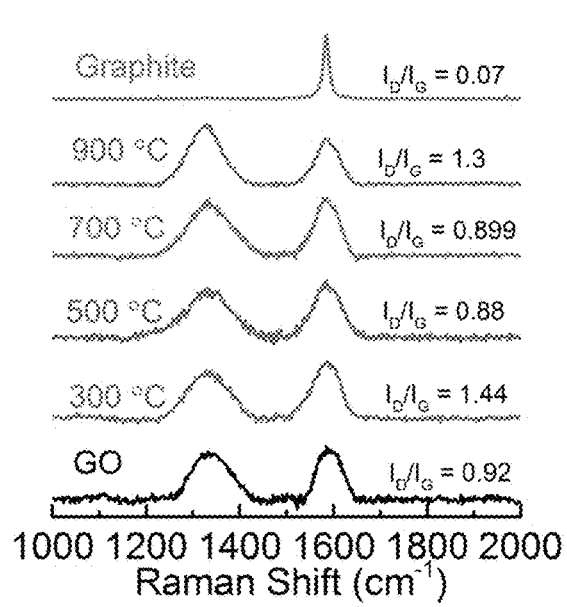
Figure 7B:
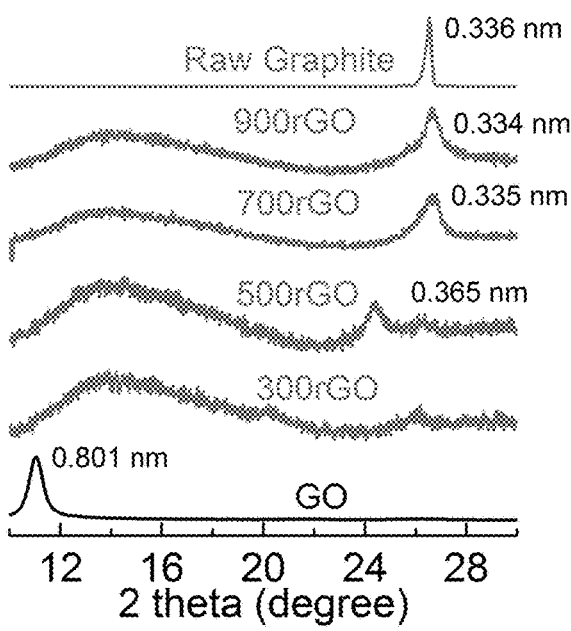

Chemical characterization of the GO prepared in Example 1 was thermally-annealed at various temperatures, with those results being presented in FIGS. 7A-K. Successful oxidation of graphite to GO, and subsequent reduction to rGO was confirmed by Raman, X-ray diffraction (XRD), and XPS techniques. The Raman spectrum in FIG. 7A showed the typical G-peak along with the emergence of D-peak in GO and rGO papers. No appreciable change was observed in peak position or width for specimens as a function of annealing temperature. Subsequent characterization involved XRD (FIG. 7B), which showed a significant increase in interlayer spacing between graphite with its characteristic peak at 26.55° 2θ (dspacing=3.4 Å) and GO at 11° 2θ (d-spacing=8.01 Å) owing to the heavy functionalization. Due to removal of oxygen groups during thermal reduction, the interlayer spacing of rGO shifted back closer to that of graphite with higher annealing temperatures. Peak broadening was also observed, which suggests large distribution of graphene interlayer spaces in the paper. Further characterization involved measurement of the electrical conductivity (FIG. 7C) by use of a four-point test setup. For the 300rGO specimen, the conductivity was considerably higher than GO paper (i.e., by almost 8 orders of magnitude). The conductivity of the papers annealed at higher temperatures gradually approached that of graphite powder with 900rGO paper showing about 5.88 S/cm. Further chemical analysis of thermally reduced GO was conducted by XPS of the C1s peak, which is shown in FIGS. 7D-G. The intensity of the C=O peak decreased while concurrently graphitic carbon and epoxy/ether carbon peak became narrower with increasing annealing temperature. The scanning electron microscopy (SEM) cross-sectional images of the free-standing papers (FIGS. 7H-K) showed more open and disordered structure as a result of annealing at elevated temperatures. This is attributed to the structural changes that occur as more and more oxygen groups are removed, leaving behind a defective graphitic plane. This increased unevenness of individual graphene sheets made the papers look fluffier with thickness increasing from 10 μm for 300rGO to 15 μm for 900rGO.

(II) Initial Electrochemical Analysis

Once the morphology and composition of the rGO papers was established, their electrochemical charge/discharge characteristics were studied as working electrode in Li- and Na-ion half-cells.

FIGS. 8A and B show the voltage charge/discharge profile and corresponding differential capacity curves of the electrodes tested in Li half-cell. When cycled at 100 mA/g anode for the first five cycles, 900rGO had the highest charge capacity of 364 mAh/g anode, followed by 700rGO, 500rGO, and 300rGO at 312, 292, and 104 mAh/g anode, respectively. The Li electrochemical capacity for 500rGO was higher than other graphene paper electrodes prepared through vacuum filtration technique. From the differential capacity curve, it was observed that all electrodes had a major anodic peak at 50 mV and a cathodic peak at ~200 mV, which are attributed to Li ion intercalation and extraction in the graphitic structure. Another anodic peak, which is characteristic to solid electrolyte interface (SEI), was observed at 550 mV for 300rGO. This peak gradually shifted to 350 mV as the annealing temperature was increased to 900° C. Annealing at higher temperatures causes individual graphene layers to get closer and perhaps more ordered in a structure similar to graphite (see XRD data), which can form SEI in LIBs at lower discharge potentials.

Na half-cell voltage discharge profiles were substantially different than LIB. As shown in FIG. 8C, when cycled at a current density of 100 mA/g anode against Na/Na+, 500rGO had the highest charge capacity of the 122 mAh/g anode. Surprisingly, all the other cells had much lower charge capacity at 20, 34 and 41 mAh/g anode for 300rGO, 700rGO, and 900rGO electrodes, respectively. The differential capacity curve (FIG. 8D) showed two anodic peaks at ~120 and 500 mV, and a cathodic peak around ~100 mV was also observed for the Na cells.

(III) Long-Term Electrochemical Analysis

In the case of Li half-cell on further cycling as shown in FIG. 8E, 900rGO maintained the charge capacity at 324 mA/g anode (90% capacity retention) while 700rGO and 500rGO only retain 83% and 72% of its initial capacity, respectively. With increasing current density of 2.4 A/g, charge capacity of 900rGO dropped down to the same level as that of 700rGO at 180 mAh/g. However, the cell reverted back to a higher capacity once it was brought back to a current density of 100 mA/g anode. The electrodes were subjected to further abuse by symmetric cycling at a current density of 1.6 A/g electrode for an additional 1,000 cycles (FIG. 8F). The 900rGO was the best performing cell with a very stable charge capacity of 72 mAh/g anode that increased back to its original first-cycle charge capacity of 327 mAh/g anode when the cell was cycled at 100 mA/g anode. On the other hand, the 300rGO electrode had practically no charge capacity at 1.6 A/g anode, and the cell had fickle performance when cycled back at 100 mA/g anode, indicating that the anode structural integrity was compromised.

For the Na half-cell, the rate capability data is shown in FIG. 8G. The 500rGO had the best performance, with a charge capacity of 115 mAh/g anode (95% of first cycle capacity) after 5 cycles. The cell remained fairly stable, with a charge capacity of 52 mAh/g anode even at an extremely high current density of 2.4 A/g. And when cycled back at 100 mA/g anode, it recovered to a stable charge capacity at 110 mAh/g anode, which is 98% of its initial capacity. The 500rGO had a relatively high charge capacity even when cycled symmetrically at 1.6 A/g anode. Impressively, when the cell was reverted back to cycling at 100 mA/g anode, the charge capacity recovered to its initial value and the cell performance was stable thereafter for another 50 cycles.

Figure 7C:
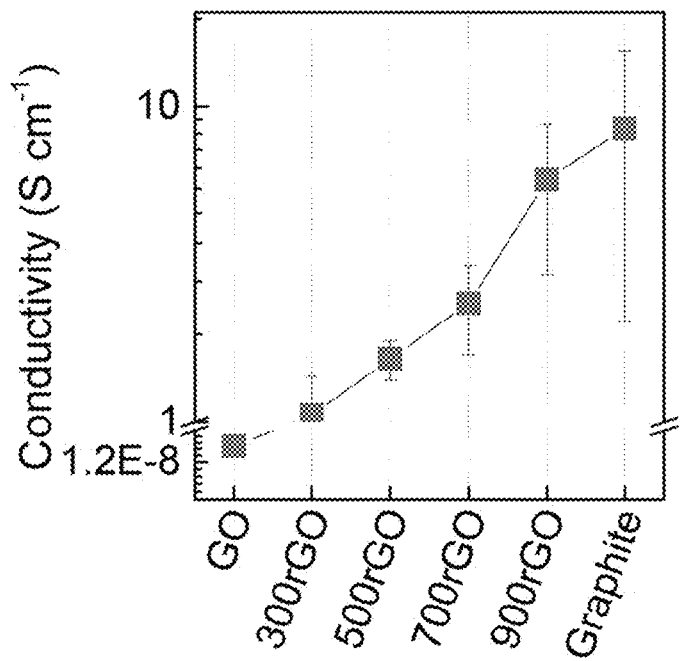

Based on the performance of all electrodes cycled in the Li half-cell, the increase in charge or reversible capacity with increasing thermal reduction temperature was attributed to: (a) the observed decrease in the percentage of oxygen functional groups present in the GO and the increased degree of crystallization of the rGO as shown in FIG. 9; and (b) the resulting improvement in electrical conductivity of the composite paper (FIG. 7C). However, for electrodes cycled in the Na half-cell, the charge capacity and the columbic efficiency decreased with an increasing degree of crystallization for specimens reduced at 700° C. and 900° C. This could again be attributed to that fact that the Na intercalation capacity of ordered graphite is negligible, while the higher charge capacity of the 500rGO over the 300rGO electrode is attributed to Na intercalation in expanded graphene layers due to the oxygen groups still present in the material.

In order to further substantiate these observations, specimens were annealed in $NH_3$ atmosphere, rather than Ar. The reduction of GO in ammonia simultaneously reduces GO to rGO, bring more order to its structure and improving electrical conductivity due to N-doping. Only the best performing Li and Na electrodes (i.e., 900 rGO and 500 rGO) were annealed in ammonia and their cyclic performances compared. The XRD plot showing improved order of graphene in rGO, the electrical conductivity data showing improvement due to N-doping, and the cycling data each lead to two very important observations. Specifically: (a) the Li charge capacity for 900 $rGO/NH_3$ did not improve but its Li rate capability was astoundingly high, and the electrode delivered a straight-line performance (~200 mAh/g at 2400 mA/g); and (b) the Na charge capacity for 500 $rGO/NH_3$ was a complete shut-down (~10 mAh/g). These observations show that high Na intercalation in graphene paper electrode is a combination of two factors: moderate electrical conductivity; and disordered or expanded nature of rGO sheets.

(IV) Post-Electrochemical Analysis

Later, the cells were disassembled in lithiated or sodiated state to study the electrode's morphology and chemical structure. Spherical SEI structures were observed on Li-cycled electrodes (b), while Na-cycled electrodes showed pine leaf-like features (e). (Note: In (a) and (d) only half the paper electrode is shown, the other half was dispersed in EC/DMC solution for preparing the TEM specimens).

FIGS. 10A-C show digital camera images as well as high-resolution SEM images and corresponding TEM images of 900rGO-Li anodes. FIGS. 10D-F show digital camera images as well as high-resolution SEM images and TEM images of and 500rGO-Na anodes. Remarkably all electrode specimens looked intact with no visible large or micro surface cracks. Further, a stable SEI layer formation and the presence of glass fiber separator residue could be observed. When the high-resolution SEM and TEM images of anodes cycled in Li half-cell and Na half-cell were compared, very distinct differences could be observed. In case of the Li-cycled electrode, the SEI had formed in the shape of circular balls but in the case of Na-cycled electrodes, layering with pine tree-like features and nano-flower-like features were observed. Similar differences were observed in the TEM images also.

(V) Mechanical Characterization

We performed static tensile testing of papers to ascertain the fracture strength and strain to failure as described previously. Engineering stress-strain plots derived from load displacement curves and digital images at various stage of the specimen loading are presented in FIG. 5 (a through c). Both the fracture strength and corresponding strain to failure decreased with increasing annealing temperature used. The papers annealed at 700'C and 900° C. were considerably more brittle than those annealed at 500° C. The fracture strength was observed to be almost an order of magnitude lower than those reported for the rGO papers prepared by chemical reduction at room temperatures, whereas the failure strain was observed to be almost 2-3 times higher than highly ordered well-packed rGO paper prepared at room or slightly higher temperatures. The decrease in strength for specimens annealed at higher temperatures is attributed to the structural damage and introduction of vacancies and other topological defects in the platelets as the result of the release of gaseous components under high pressures.

The high strain to failure (as high as 3%) observed in all specimens is most likely due to the highly crumpled structure of the paper allowing considerable straightening and unfolding of the platelets upon application of the tensile load (FIG. 11).

Conclusions Pertaining to rGO Paper

In summary, long-term lithium and sodium cycling behavior of free-standing GO paper electrodes were prepared by vacuum-assisted assembly technique followed by reduction at different temperatures in order to modulate the paper defect density, electrical conductivity, and mechanical strength. The Li charge capacity of the electrode increased with increasing thermal reduction temperature, demonstrating a stable charge capacity of ~325 mAh/g (total electrode weight) at 900° C., one of the highest reported for GO paper electrodes prepare by similar techniques. The Na charge capacity was the highest for specimens annealed at 500° C. in Ar (~110 mAh/g at 100 mA/g, total electrode weight or ~77 mAh/cm at 70 μA/cm based on total volume of the electrode) and near zero for specimens annealed at the same temperature in $NH_3$ and 900° C. in Ar. These observations are a direct result of the changing nature of ordering in graphene layers in the paper electrodes (i.e., increasing order and decreased interlayer spacing caused complete shutdown of sodium's cyclability in the paper electrodes).

We claim:

1. A method of preparing an exfoliated dichalcogenide comprising:
   providing a layered dichalcogenide to be exfoliated;
   contacting said layered dichalcogenide with a superacid and causing the dichalcogenide to exfoliate and yield said exfoliated dichalcogenide.

2. The method of claim 1, wherein said exfoliated dichalcogenide is in the form of flakes.

3. The method of claim 1, wherein said dichalcogenide is a disulfide.

4. The method of claim 1, wherein said dichalcogenide is a transition metal dichalcogenide.

5. The method of claim 4, wherein said transition metal is selected from the group consisting of Mo, W, Hf, Fe, and Sn.

6. The method of claim 1, wherein said superacid comprises chlorosulphonic acid.

7. The method of claim 1, wherein said providing step comprises providing the dichalcogenide in powder form.

8. The method of claim 7, wherein said providing step comprises dispersing said dichalcogenide powder in said superacid followed by sonication of said powder and superacid dispersion.

9. The method of claim 7, wherein said contacting step comprises adding said superacid to said dichalcogenide powder under an argon atmosphere.

10. The method of claim 1, said method further comprising quenching said exfoliated dichalcogenide with distilled water.

11. The method of claim 1, wherein said exfoliated dichalcogenide comprises a stable dispersion of said exfoliated dichalcogenide in an aqueous solution.

* * * * *